(12) United States Patent
Rollins et al.

(10) Patent No.: US 10,804,770 B2
(45) Date of Patent: Oct. 13, 2020

(54) LINE REPLACEABLE UNIT (LRU) SENSOR SYSTEMS FOR MOTORS AND OTHER MACHINES

(71) Applicant: Prime Datum Development Company, LLC, Canandaigua, NY (US)

(72) Inventors: Patrick M. Rollins, Canandaigua, NY (US); George Lucas, Canandaigua, NY (US)

(73) Assignee: Prime Datum Development Company, LLC, Canandaigua, NY (US)

( * ) Notice: Subject to any disclaimer, the term of this patent is extended or adjusted under 35 U.S.C. 154(b) by 280 days.

(21) Appl. No.: 15/577,743

(22) PCT Filed: Jun. 1, 2016

(86) PCT No.: PCT/US2016/035218
§ 371 (c)(1),
(2) Date: Nov. 28, 2017

(87) PCT Pub. No.: WO2016/196596
PCT Pub. Date: Dec. 8, 2016

(65) Prior Publication Data
US 2018/0131255 A1 May 10, 2018

Related U.S. Application Data

(60) Provisional application No. 62/169,099, filed on Jun. 1, 2015.

(51) Int. Cl.
*H02K 11/20* (2016.01)
*H02K 5/22* (2006.01)
*H01R 39/08* (2006.01)

(52) U.S. Cl.
CPC ............ *H02K 11/20* (2016.01); *H01R 39/08* (2013.01); *H02K 5/225* (2013.01); *H02K 2213/09* (2013.01)

(58) Field of Classification Search
CPC ..... H02K 11/20; H01L 41/053; H01L 41/047; H01L 41/0475
(Continued)

(56) References Cited

U.S. PATENT DOCUMENTS 5,917,428 A 6/1999 Discenzo
6,037,702 A * 3/2000 Tamai ............... H01L 41/053
310/323.06
(Continued)

FOREIGN PATENT DOCUMENTS

EP 1213564 A2 6/2002
EP 2642255 A2 9/2013
(Continued)

OTHER PUBLICATIONS

Supplementary Search Report.
International Search Report and Written Opinion for PCT/US2016/035218.

*Primary Examiner* — Derek J Rosenau
(74) *Attorney, Agent, or Firm* — Raymond A. Nuzzo

(57) ABSTRACT

A motor has a housing which comprises a cavity and a socket accessible from outside the housing. The socket has an interior surface. The motor includes a LRU sensor system which comprises an LRU sensor having electrical conductors and internal sensor wiring that is electrically connected to the electrical conductors and electrical conductors on the interior surface of the socket, wherein when the LRU sensor is positioned in the socket, the electrical conductors on the LRU sensor contact the electrical conductors on the interior surface of the socket.

12 Claims, 16 Drawing Sheets

(58) Field of Classification Search
USPC ...... 310/323.01–323.21, 322, 334, 348, 365, 310/366
See application file for complete search history.

(56) References Cited

U.S. PATENT DOCUMENTS

| | | |
|---|---|---|
| 6,262,550 B1 | 7/2001 | Kliman et al. |
| 6,305,944 B1 | 10/2001 | Henry |
| 6,510,397 B1 | 1/2003 | Choe |
| 6,912,484 B2 | 6/2005 | Bibelhausen |
| 6,933,656 B2 * | 8/2005 | Matsushita .......... H02N 2/0045 310/323.12 |
| 7,322,794 B2 | 1/2008 | LeMieux |
| 7,479,876 B2 | 1/2009 | Carle |
| 7,539,549 B1 | 5/2009 | Discenzo |
| 8,111,028 B2 | 2/2012 | Rollins et al. |
| 2006/0241910 A1 | 10/2006 | Petchenev |
| 2011/0313726 A1 | 12/2011 | Parthasarathy |
| 2012/0101776 A1 | 4/2012 | Brower |
| 2014/0244051 A1 | 8/2014 | Rollins et al. |
| 2014/0352415 A1 | 12/2014 | Groenhuijzen |
| 2015/0333457 A1 * | 11/2015 | Liu ..................... H01R 13/713 335/208 |
| 2016/0069624 A1 | 3/2016 | Rollins et al. |

FOREIGN PATENT DOCUMENTS

| | | |
|---|---|---|
| GB | 2389659 A | 12/2003 |
| WO | WO 2011076263 A1 | 6/2011 |
| WO | WO 2014082582 A1 | 6/2014 |

\* cited by examiner

LINE REPLACEABLE UNIT (LRU) SENSOR SYSTEMS FOR MOTORS AND OTHER MACHINES

CROSS-REFERENCE TO RELATED APPLICATIONS

This application claims the benefit of U.S. provisional application No. 62/169,099, filed Jun. 1, 2015. The entire disclosure of U.S. application No. 62/169,099 is hereby incorporated by reference.

TECHNICAL FIELD

The present invention generally relates to sensor systems for machines, including but not limited to motors, compressors, generators, turbines and pumps.

BACKGROUND ART

Cooling towers utilize relatively large motors to rotate the cooling tower fan. The cooling tower fans are of various sizes but can have diameters as large as forty feet. The health of the motor is vital to the efficient and safe operation of the cooling tower. Motor sensors are used to provide information about motor health and the components that they drive, such as vibrations, bearing wear or heat within the motor housing or casing. Sensors are also used to provide information about the exterior motor temperature. Some sensors on the motor can measure the vibrations of the cooling tower fans. This feature is especially useful in preventing damage to the cooling tower structure cause by fan imbalance and failed fan blades. Air flow sensors can be used to measure the flow of air produced by the rotation of the cooling tower fan. Other sensors used in cooling towers include, but are not limited to, pressure sensors, displacement sensors, gas monitor sensors, infrared sensors, encoders, optical encoders, and position, speed and mechanical load sensors. Most all sensors require a communication cable in electronic signal communication with the sensor. The sensor outputs a signal, such as an electrical voltage, which may be inputted into another device, such as a signal conditioner. The signal conditioner processes and decodes the sensor signal so as to yield a signal that represents temperature, vibration or force. These signals may then be inputted into other components such as electronically commutated motors, variable frequency drives (VFD) variable speed device (VSD) or an industrial computer. Thus, the sensor signals can be used as part of a feedback scheme that controls the operation of the motor and the safety and efficiency of the driven system.

Some sensors require power, or an input voltage or some type of input communications signal. These types of sensors are typically used with communication cables that have multiple terminals at the wire-connector end in order to provide and receive these various power and communications signals to and from, respectively, the sensor. Such sensors, wires and communication cables are typically configured for relatively low voltage and current with relatively small gauge wires. These communication cables typically have internal shielding and are easily routed on the exterior of the motor. Communication cables, however, frequently break and corrode. Furthermore, a broken communication cable can spark and cause a fire or explosion in a hazardous environment such as a cooling tower. One attempt to solve these problems is to run the communication cable in a protective conduit or cable gland. However, even when the communication cables are within conduits or cable glands, the communication cables still experience corrosion and contamination when these communication cables are used in wet, harsh environments such as wet cooling towers. This corrosion and contamination make it difficult to separate electrical connectors when external motor sensors need to be replace thereby requiring cables, leads and conduit to be replaced. Such maintenance necessitates shutting down the cooling tower resulting in reduced production and increased maintenance costs. Another attempt to solve the problems associated with corrosion and contamination is to build the sensors into the frame work of the motor. This is typically done for temperature sensors such as RTD sensors and Thermocouple sensors. However, over time, these RTD and Thermocouple sensors have a less-than-desirable MTBF and cannot be replaced in the field. RTD and Thermocouple sensors are typically replaced when the motor is being re-wound and overhauled at a motor repair facility. Furthermore, if the sensor is mission critical, such as a vibration sensor, the motor may have to be replaced in order to comply with OSHA safety regulations.

What is need is a sensor system that substantially eliminates the foregoing problems and disadvantages associated with prior art motor sensor systems.

DISCLOSURE OF THE INVENTION

In one aspect, the present invention is directed to Line Replaceable Unit (LRU) sensor systems for use with motors that monitor and supervise various parameters of the motor and the safe and efficient operation of their driven systems, including but not limited to, vibrations and temperature. The LRU sensor is comprised of sensors that are installed within the protection of the motor cavity and utilize internal Wireways within the motor for power, communication and grounding. These wireways all connect at a common point or junction box within the motor cavity that allows for at least one single quick-disconnect at the motor casing for ease of connecting outside power and communication to the motor for safe and efficient operation.

Even though each sensor could be wired individually by an electrician utilizing wires internal or external to the motor, in the preferred embodiment, the LRU sensors are configured for "plug and play" installation, eliminating the need for wiring and a skilled electrician to perform the task. In this preferred embodiment, the sensors are installed similar to a light bulb where the bulb is screwed into a powered socket and connected internally within the socket to electrical power without any wires required to be connected, grounded or terminated. The installation of these LRU sensors is similar to a USB Flash Drive which is connected to a corresponding USB port and draws power from the port to operate the USB Flash Drive.

The sensors of the LRU sensor systems can easily be replaced in the field by maintenance mechanics using common hand tools. The maintenance mechanics do not need special training to replace the sensors. The sensors of the LRU sensor systems are replaced without having to move or remove the motor thereby allowing maintenance mechanics to return the motor to safe operation in a minimal amount of time.

A significant advantage of the LRU sensor systems of the present invention is that all power and communication wiring of the LRU sensor system is routed within the interior or cavity of the motor thereby protecting the power and communication wiring from impact damage, corrosion and contamination.

Significant benefits of the LRU sensor systems of the present invention are the elimination of the complex prior art communication cable and gland system and the need for an electrician to service the aforesaid communication cable and gland system.

Another benefit of the LRU sensor systems of the present invention is that, since the sensors, communication cables and other associated wiring are located within the interior or cavity of a sealed motor, the sensors, cables and wires are isolated from explosive or hazardous environments thereby eliminating the risk of fire or explosions commonly associated with defective or compromised prior art external conduit systems.

Another benefit is that commercially available current art sensors may be adapted for use in the LRU sensor systems of the present invention.

Other benefits of the LRU sensor systems of the present invention are improved reliability, production, safety, plug-and-play capability and reduced need for skilled labor.

The LRU sensor systems can also be used with other machinery, including but not limited to, pumps, compressors, turbines and other mission critical machinery.

In some embodiments, the LRU sensor system is used with a sealed motor wherein the sealed motor has in the cavity thereof a sensor power source for powering the LRU sensor, an amplifier for amplifying LRU sensor output signals and a condition monitoring device. In another embodiment, the sensor power source, amplifier and condition monitoring device are located on the sealed motor. In a further embodiment, the sensor power source, amplifier and condition monitoring device are located about the sealed motor.

BEST MODE FOR CARRYING OUT THE INVENTION

As used herein, the term "motor" shall mean any electric motor with a rotor and stator that creates flux.

As used herein, the terms "casing" and "housing" are used interchangeably and shall have the same meaning and include casings or housings for motors, pumps, compressors, turbines, turbomachinery, and generators. In the case of motors, the terms "casing" and "housing" shall include the top and bottom covers of the motor.

As used herein, terms "cavity" and "interior" shall mean the interior of the casing or housing.

Although the ensuing description is in terms of the LRU sensor systems of the present invention being used with motors, it is to be understood that the LRU sensor systems can be used in other types of machinery, including but not limited to generators, compressors, pumps, turbines, turbomachinery and turbines.

It to be understood that the LRU sensors described herein can be configured to sense vibrations, temperature, heat, airflow, moisture, humidity, harmful or toxic gases or fumes and bacteria, including legionella.

It is also to be understood that the LRU sensors described herein may be configured as wireless sensors, photonic sensors, infrared sensors, optical sensors, fiber optic sensors, optical encoder sensors and radio-frequency (RF) sensors.

FIGS. 1A-1J show different embodiments of terminal pairs that maybe used in the LRU sensor systems of the present invention. In a preferred embodiment, a terminal pair discretely connects only one of the following: (a) electrical current, (b) electrical ground or (c) communication signals. However, in alternate embodiments, a terminal pair discretely connects electrical power and at least one communication signal.

Figure 1A:
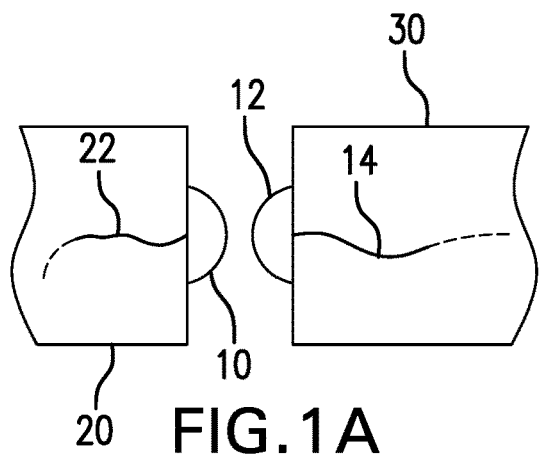
FIG. 1A is a diagram illustrating an electrical interface in accordance with one embodiment of the present invention.

Referring to FIG. 1A, there is shown a pair of raised terminals 10 and 12 that are similar to battery terminals in a common flashlight. Terminal 10 is part of LRU sensor 20. LRU sensor 20 includes wiring 22 that is electrically connected to terminal 10. Terminal 12 is at a particular location on motor housing or casing 30 such as within a socket or female receptacle formed in the motor housing or casing 30. Wiring 14 is electrically connected to terminal 12 and a wiring network (not shown) that is located within the interior or cavity of the motor. When terminal 10 and terminal 12 contact each other, a closed electrical circuit is created such that the wiring network inside the motor housing 30 is electrically connected to the wiring of LRU sensor 20. This closed electrical circuit forms an electrical path for electrical current, electrical ground or communication signals.

In one embodiment, the motor housing 30 has a socket or female receptacle and at least one raised terminal 12 located within the socket or female receptacle. When the LRU sensor 20 is positioned within the socket or female receptacle, terminal 10 contacts terminal 12. In an alternate embodiment, either or both terminals 10 and 12 are spring loaded to ensure positive and firm engagement.

Figure 1B:
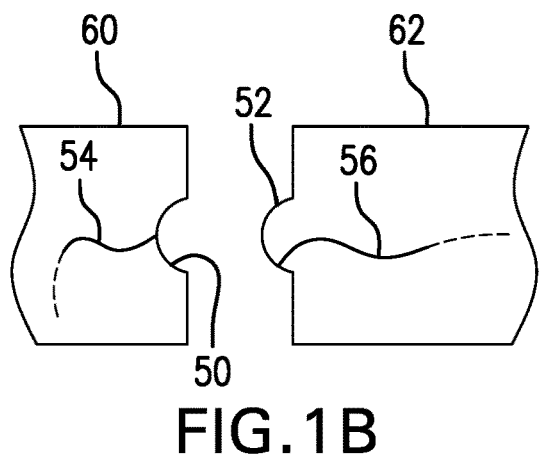
FIG. 1B is a diagram illustrating an electrical interface in accordance with another embodiment of the present invention.

Referring to FIG. 1B, shows a receptacle-terminal pair comprising female receptacle 50 and male terminal 52. Wiring 54 is electrically connected to female receptacle 50. Wiring 56 is electrically connected to male terminal 52. Female receptacle 50 is part of assembly 60 which can be either an LRU sensor or a motor housing. Male terminal 52 is part of assembly 62 which can be either an LRU sensor or the motor housing. In one embodiment, assembly 60 is a motor housing, female receptacle 50 is located within a socket or female receptacle formed in the motor housing and assembly 62 is an LRU sensor having male terminal pin 52. Wiring 54 is electrically connected to the internal wiring network inside the motor cavity. When male terminal pin 52 is inserted into and contacts female receptacle 50, a closed electrical circuit is created comprising the LRU sensor 62, wiring 56, male terminal pin 52, female receptacle 50, wiring 54 and the wiring network in the motor interior. This closed electrical circuit forms an electrical path for electrical current, electrical ground or communication signals.

In an alternate embodiment, male terminal 52 is spring-loaded to ensure positive and firm engagement with female receptacle 50.

Figure 1C:
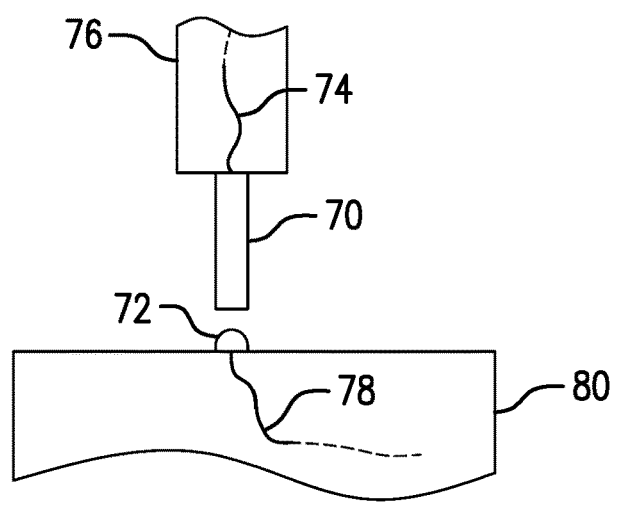
FIG. 1C is a diagram illustrating an electrical interface in accordance with another embodiment of the present invention.

Referring to FIG. 1C, there is shown a terminal pair that comprises terminal pin 70 and raised terminal 72. Terminal pin 70 includes wiring 74. Wiring 74 is electrically connected to terminal pin 70. Terminal pin 70 is part of assembly 76 which, in one embodiment, is an LRU sensor in accordance with the invention. Raised terminal 72 includes wiring 78. Wiring 78 is electrically connected to raised terminal 72. Raised terminal 72 is part of assembly 80 which, in one embodiment, is the housing or casing of a motor. The motor includes an internal wiring network in the motor interior or cavity. Wiring 78 is electrically connected to the aforementioned internal wiring network. When terminal pin 70 and raised terminal 72 contact each other, a closed electrical circuit is created which comprises wiring 78, raised terminal 72, terminal pin 70 and wiring 74 such that the internal wiring network inside the motor is now in electronic signal communication with the LRU sensor. This closed electrical circuit forms an electrical path for electrical current, electrical ground or communication signals.

In one embodiment, terminal pin 70 is spring-loaded to ensure firm and positive engagement with raised terminal 72.

An advantage of raised terminal 72 is that if raised terminal 72 is located at the bottom of a socket or female receptacle in a motor housing and foreign particles or contaminants collected in the socket, raised terminal 72 would protrude above the layer of foreign particles or contaminants.

Figure 1D:
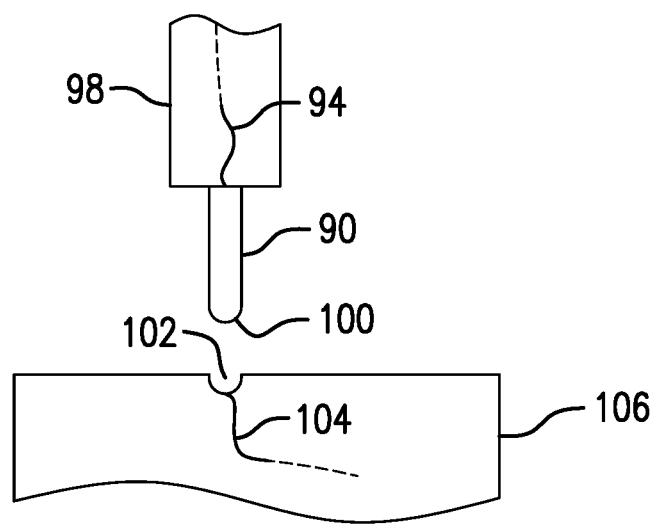
FIG. 1D is a diagram illustrating an electrical interface in accordance with another embodiment of the present invention.

Referring to FIG. 1D, there is shown another terminal pin and female receptacle combination. Terminal pin 90 includes wiring 94 and is part of assembly 98 which, in one embodiment, is an LRU sensor in accordance with the invention. Terminal pin 90 has a rounded tip 100. Female receptacle 102 includes wiring 104 and is part of assembly 106 which, in one embodiment, is the casing of a motor. The motor includes an internal wiring network in the cavity of the motor and wiring 104 is electrically connected to the internal wiring network. Rounded tip 100 is shaped and configured so as to fit into female receptacle 102. When rounded tip 100 of pin terminal 90 is positioned within female receptacle 102, a closed electrical circuit is created such that the internal wiring network inside the motor is electrically connected to wiring 104, female receptacle 102, terminal pin 90, wiring 94 and the LRU sensor. This closed electrical circuit forms an electrical path for electrical current, electrical ground or communication signals.

In an alternate embodiment, terminal pin 90 is spring-loaded to ensure firm and positive engagement with female receptacle 102.

Figure 1E:
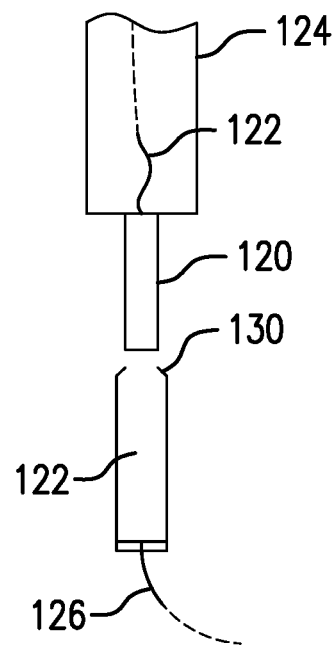
FIG. 1E is a diagram illustrating an electrical interface in accordance with another embodiment of the present invention.

Referring to FIG. 1E, there is shown another terminal pin and female receptacle combination in accordance with the invention. In this embodiment, the terminal pin engages the female receptacle similar to the way mating DIN connectors are engaged together. DIN connectors are well known in the art and are therefore not discussed herein. Terminal pin 120 has the same configuration as terminal pin 70 shown in FIG. 1C. Terminal pin 120 includes wiring 122. Wiring 122 is electrically connected to terminal pin 120. Terminal pin 120 is part of assembly 124 which, in one embodiment, is an LRU sensor in accordance with the invention. In this embodiment, female receptacle 122 is configured as a sleeve. Sleeve 122 is sized to receive terminal pin 120. Wiring 126 is electrically conducted to sleeve 122. Sleeve 122 is located in the casing of a motor. Sleeve 122 can be formed during the manufacture of the casing. The motor has an internal wiring network and wiring 126 is electrically connected to the internal wiring network. When terminal pin 120 is disposed within sleeve 122, a closed electrical circuit is formed in which creates an electrical path for electrical current, electrical ground or communication signals.

In a preferred embodiment, terminal pin 120 and sleeve 122 are sized so that there is an interference fit between terminal pin 120 and sleeve 122 in order to improve the integrity of the electrical connection.

In one embodiment, wiper 130 positioned at the entrance of sleeve 122. Wiper 130 creates the same effect as an interference fit. As terminal pin 120 is pushed through this area and into sleeve 122, wiper 130 scrapes the exterior surface of terminal pin 120 so as to remove dirt, grime, oxidation and other foreign particles. Wiper 130 actually scratches the exterior surface of terminal pin 120 thereby providing a clean surface that contacts sleeve 122 to create a high-integrity electrical connection between terminal pin 120 and sleeve 122. Wipers may be configured to have any shape or design, depending upon the application. Wiper structures are well known in the art and are therefore not discussed in detail herein.

In an alternate embodiment, an auxiliary seal is added to the entrance of sleeve 122. In a further embodiment, a wiper gasket encloses the opening of sleeve 122 when the terminal pin 120 is withdrawn from sleeve 122 so as to prevent dirt, moisture and foreign particles from entering sleeve 122.

Figure 1F:
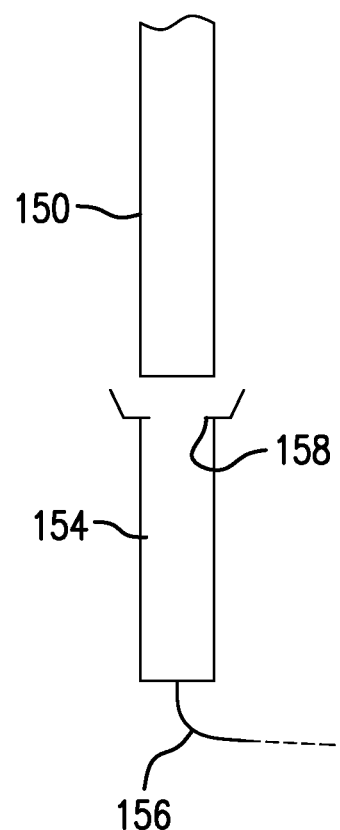
FIG. 1F is a diagram illustrating an electrical interface in accordance with another embodiment of the present invention.

Referring to FIG. 1F, which is similar to a common household appliance plug and outlet, there is shown another embodiment of a scheme for electrically connecting an LRU sensor to a socket or female receptacle in a motor casing. In this embodiment, terminal 150 comprises a terminal spade. Terminal spade 150 is part of an LRU sensor. Terminal spade 150 is sized for an interference fit within female receptacle or socket 154. Socket 154 includes wiring or conductor 156 which is electrically connected to an internal wiring network inside the motor cavity that may electrically connect power, communication or provide grounding.

In an alternate embodiment, an auxiliary seal or gasket is used at the entrance to female receptacle 154. In a further embodiment, wiper 158 is used at the entrance to female receptacle 154 and is configured for an interference fit with the interior of female receptacle 154. As terminal pin 150 is pushed into female receptacle 154, wiper 158 cleans and scrapes terminal pin 150 so as to improve the integrity of the electrical connection between terminal pin 150 and female receptacle 154.

Figure 1G:
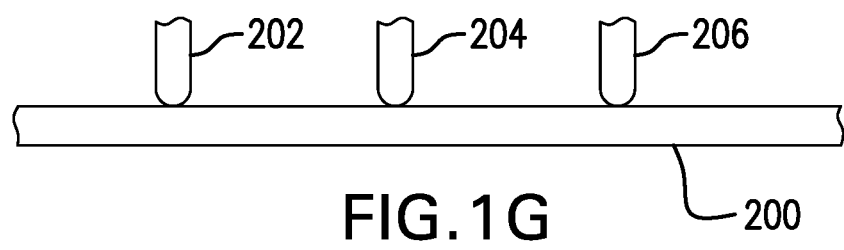
FIG. 1G is a diagram illustrating an electrical interface in accordance with another embodiment of the present invention.
Figure 1H:
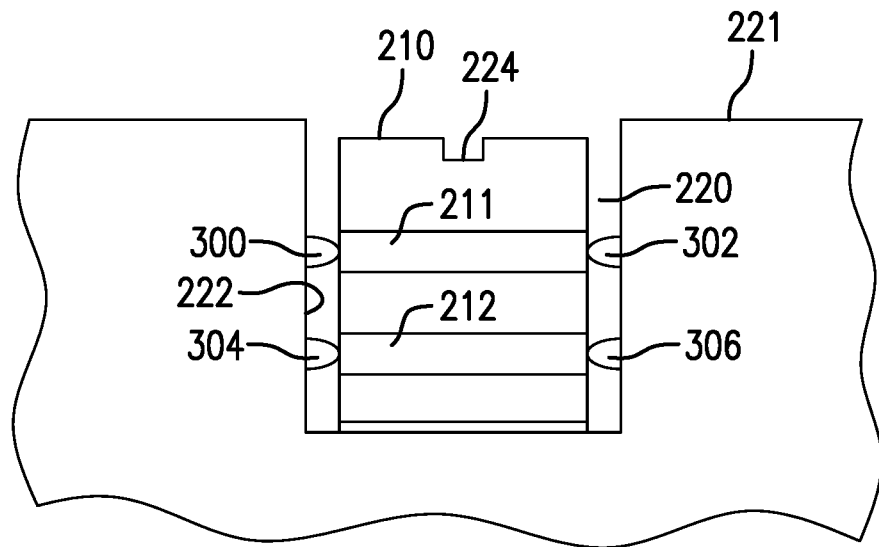
FIG. 1H is a diagram illustrating an electrical interface in accordance with another embodiment of the present invention.

Referring to FIG. 1G, there is shown electrically conductive strip 200 that is used with a plurality of terminals pins 202, 204 and 206. Each terminal pin 202, 204 and 206 is part of a corresponding LRU sensor. In this embodiment, each terminal pin 202, 204 and 206 is a raised terminal pin. The electrically conductive strip 200 is similar in construction to the power strip described in U.S. Pat. No. 8,894,296, entitled "Powered CAT 5 Plug and Socket", the disclosure of which patent is incorporated by reference. The electrically conductive strip 200 may be used as a power strip or grounding strip, or may be used to deliver communication signals to the LRU sensors. For example, electrically conductive strip 200 may be used as a power strip to provide power or electrical ground to the plurality of terminals pins 202, 204 and 206. Although three terminal pins 202, 204 and 206 are shown in FIG. 1G, it is to be understood that electrically conductive strip 200 may be used with fewer than three terminal pins or more than three terminal pins. In one embodiment, electrically conductive strip 200 may be applied to the inner surface of a female receptacle or socket and each raised terminal pin 202 may be part of an LRU sensor. In another embodiment, one or more electrically conductive strips 200 are attached, joined or formed on the exterior surface of an LRU sensor. This embodiment is illustrated in FIG. 1H. Cylindrically shaped LRU sensor 210 is located within socket 220. Socket 220 is located in the casing or housing 221 of a motor or other machine. Electrically conductive strips 211 and 212 are attached to the exterior surface of LRU sensor 210 and are applied to the entire circumference or perimeter of the LRU. Electrically conductive strips 211 and 212 are identical in construction to electrically conductive strip 200 shown in FIG. 1G. LRU sensor 210 includes recess 224. Recess 224 is sized to receive a tool for removing LRU sensor 210 from socket 220 or inserting LRU sensor 210 into socket 220. Socket 220 has an inner surface 222. Raised terminal pins 300, 302, 304 and 306 are attached or joined to inner surface 222. When LRU sensor 210 is completely inserted into socket 220, electrically conductive strip 211 contacts raised terminal pins 300 and 302 and electrically conductive strip 212 contacts raised terminal pins 304 and 306. Raised terminal pins 300, 302, 304 and 306 are electrically connected to an internal wiring network that inside the motor cavity. LRU sensor 210 is completely accessible from outside the motor casing 221 and thus can be replaced without having to access the cavity of the motor.

Figure 1I:
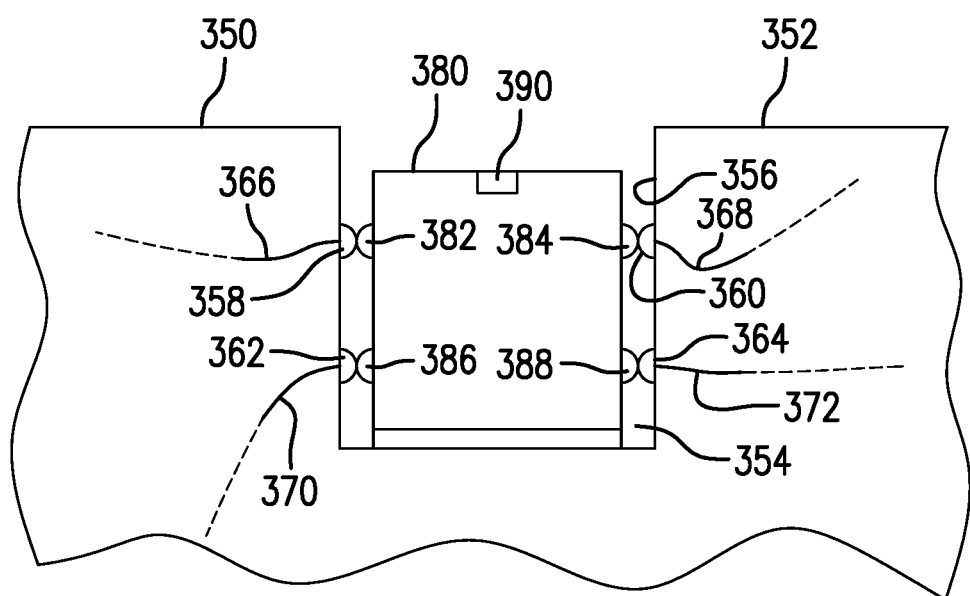
FIG. 1I is a diagram illustrating an electrical interface in accordance with another embodiment of the present invention.

Referring to FIG. 1I, there is shown an LRU sensor system that uses the raised terminal pin embodiment shown in FIG. 1A herein. Motor 350 comprises casing 352. Casing 352 has socket 354 which has an inner surface 356. Raised terminal pins 358, 360, 362 and 364 are attached or joined to inner surface 356. Wires or electrically conductive members 366, 368, 370 and 372 are electrically connected to raised terminal pins 358, 360, 362 and 364, respectively, and to an internal wiring network inside the cavity of motor 350. LRU sensor 380 is positioned in socket 354 and includes raised terminal pins 382, 384, 386 and 388. The raised terminal terminals 382, 384, 386 and 388 contact the raised terminal pins 358, 360, 362 and 364, respectively. Raised terminal terminals 382, 384, 386 and 388 are electrically connected to internal wiring and circuitry of LRU sensor 380. LRU sensor 380 includes recess 390 that is sized to receive a tool (e.g. hex drive) which can be used to insert LRU sensor 380 into socket 354 or remove LRU sensor 380 from socket 354. As shown in FIG. 1I, LRU sensor 380 does not protrude above the exterior surface of casing 352. In such an embodiment, a cover can be removably attached to casing 352. A gasket or seal can be disposed between the cover and casing 352 in order to prevent moisture and foreign particles from entering socket 354. LRU sensor 380 is completely accessible from outside the motor casing 352 and thus can be replaced without having to access the cavity of the motor.

Figure 1J:
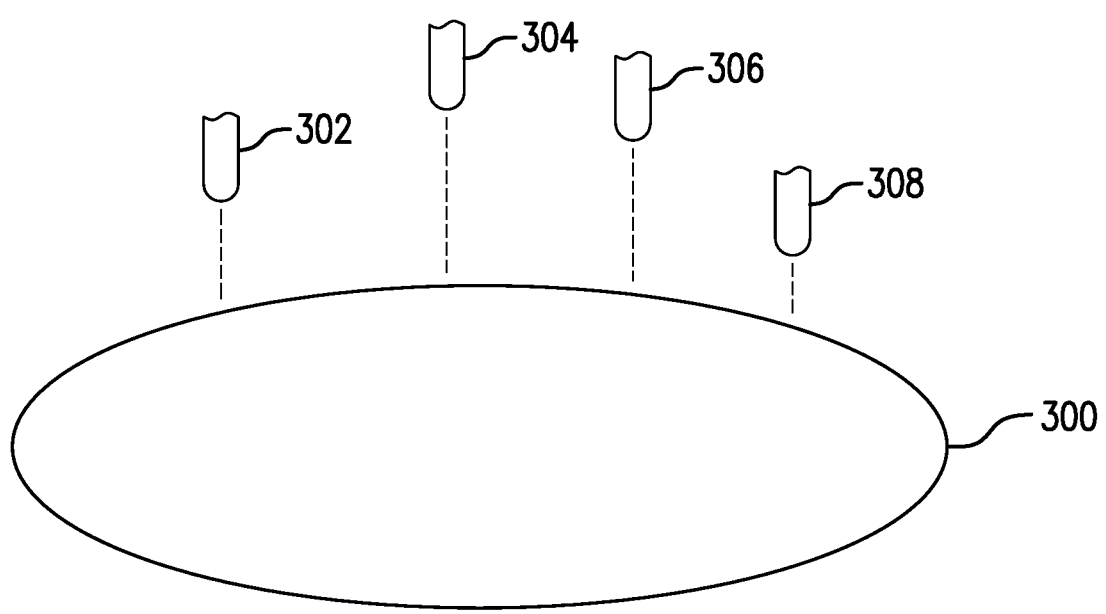
FIG. 1J is a diagram illustrating an electrical interface in accordance with another embodiment of the present invention.

Referring to FIG. 1J, there is shown electrically conductive land 300 that is configured to contact a plurality of terminal pins 302, 304, 306 and 308 and form an electrical connection with these terminal pins. Each terminal pin 302, 304, 306 and 308 can be part of a separate LRU sensor. Land 300 can be used to provide electrical power or ground to terminal pins 302, 304, 306 and 308. In other embodiments, a plurality of electrically conductive lands, identical in structure to land 300, can be used with the plurality of terminal pins wherein each electrically conductive land contacts only particular terminal pins. Each electrically conductive land may have a different function. For example, a first electrically conductive land provides electrical power, a second electrically conductive land provides electrical ground and to each terminal pin, and a third electrically conductive land provides a signal path for sensor output signals. Each electrically conductive land can be electrically connected to the internal wiring network inside the motor.

In all of the embodiments and configurations disclosed herein, the LRU sensor systems of the present invention may be realized and implemented without any regard to orientation of the LRU sensor. Therefore, the LRU sensor systems will function properly no matter if the LRU sensor is right-side up, upside down, sideways or angulated.

In one embodiment, the LRU sensor systems are configured such that the LRU sensors are removably secured to a motor by a "push and twist lock" or "insert, rotate and lock" features which are described below. In another embodiment, the LRU sensors are removably secured to a motor by an "indexed screw" feature. In a further embodiment, and as discussed in the foregoing description, the LRU sensor is interference fitted into the socket or female receptacle in the motor housing or casing.

The surface area, size, geometry, insulation, location and orientation of the aforementioned male terminals and corresponding sockets or female receptacles may be varied depending upon the particular application, the type of motor and the environment in which the LRU sensor system will be operating.

Figure 2A:
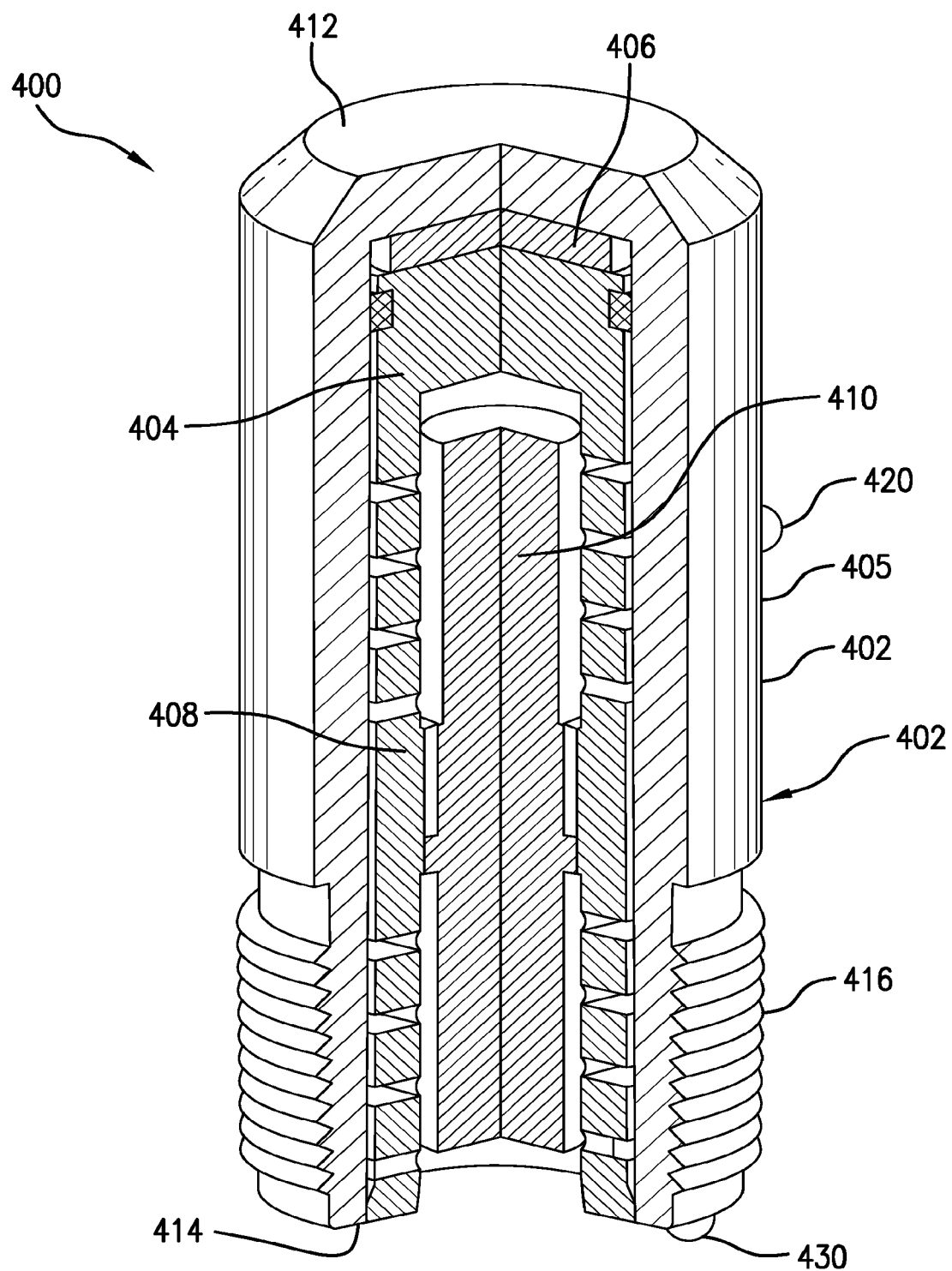
FIG. 2A is a diagram of an LRU vibration sensor in accordance with one embodiment of the invention, the view showing the interior of the LRU vibration sensor.

Referring to FIG. 2A, there is shown LRU piezoelectric sensor 400 that is used in an LRU sensor system in accordance with one embodiment of the invention. In this embodiment, LRU piezoelectric sensor 400 is a vibration sensor. LRU piezoelectric sensor 400 comprises housing 402 and interior region or space 404. Housing 402 has exterior surface 405. LRU piezoelectric sensor 400 further comprises piezoelectric element 406 and double-ended mass-spring element 408 which are located within interior region or space 404. LRU piezoelectric sensor 400 also includes an additional mass 410 within interior space 404. Housing 402 has top end 412, bottom end 414 and threaded portion 416. Threaded portion 416 is configured to be screwed into complementary mating threads of a socket or female receptacle. The structure for the LRU piezoelectric sensor 400 as described so far can be realized any one of a variety of commercially available vibration sensors. In accordance with the invention, LRU piezoelectric sensor 400 is configured to have raised terminals 420 and 430. Raised terminals 420 and 430 are electrically connected to the internal wiring (not shown) of LRU sensor 400. Terminal 420 is attached or joined to exterior surface 405 housing 402. Terminal 430 is attached or joined to bottom portion 414 of housing 402. Terminals 420 and 430 can be used to form an electrical circuit to provide electrical power, grounding or a signal path for the sensor output signals from LRU piezoelectric sensor 400. The use of raised terminals 420 and 430 eliminates the need for external connectors and wiring by an electrician. Threaded portion 416 and the complementary threads (not shown) in a socket or female receptacle (not shown) provide the proper index to facilitate a high-integrity electrical connection between terminals 420, 430 and the corresponding electrically conductive members in a socket or female receptacle in a motor housing or casing. LRU piezoelectric sensor 400 can be internally powered or it can receive electrical power from the motor or device with which it is being used.

Figure 2B:
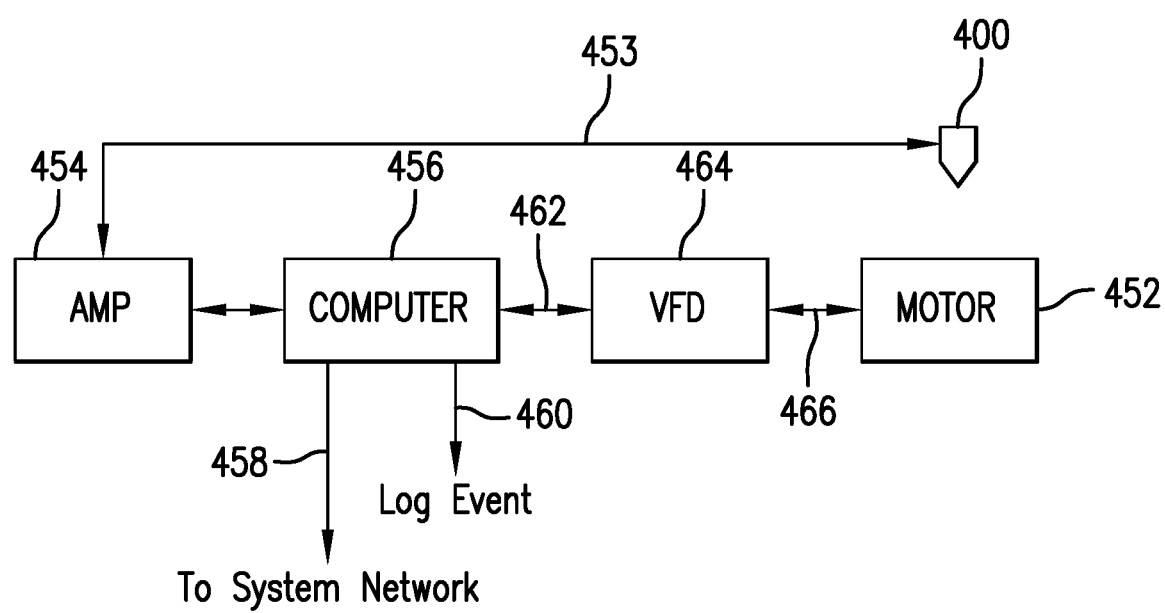
FIG. 2B is a block diagram illustrating the processing of signals outputted by a vibration sensor.

Referring to FIG. 2B, there is shown a general block diagram illustrating the operation of piezoelectric (transducer) vibration sensor 400 shown in FIG. 2A. LRU sensor 400 is removably positioned in a socket in the casing (not shown) of motor 452. LRU sensor 400 is in electronic signal communication with amplifier (AMP) 454. LRU sensor 400 outputs sensor signals 453 which are inputted into amplifier 454. Amplifier 454 amplifies and conditions sensor output signals 453 and may include a transformer to convert power supplied to the motor to a lower voltage and amperage required by the sensors. The amplified and conditioned sensor output signals are then inputted into computer 456. Computer 456 processes the sensor signals with one or more signal processing algorithms that are well known in the art, and then outputs processed signals 458 that are sent to other equipment and devices in the system network. Computer 456 also outputs Log Event data 460. Computer 456 also outputs processed signals 462 for input into variable frequency drive (VFD) device 464. In response to processed signals 462, VFD 464 outputs signals 466 that control the operation (e.g. RPM) of motor 452.

Figure 2C:
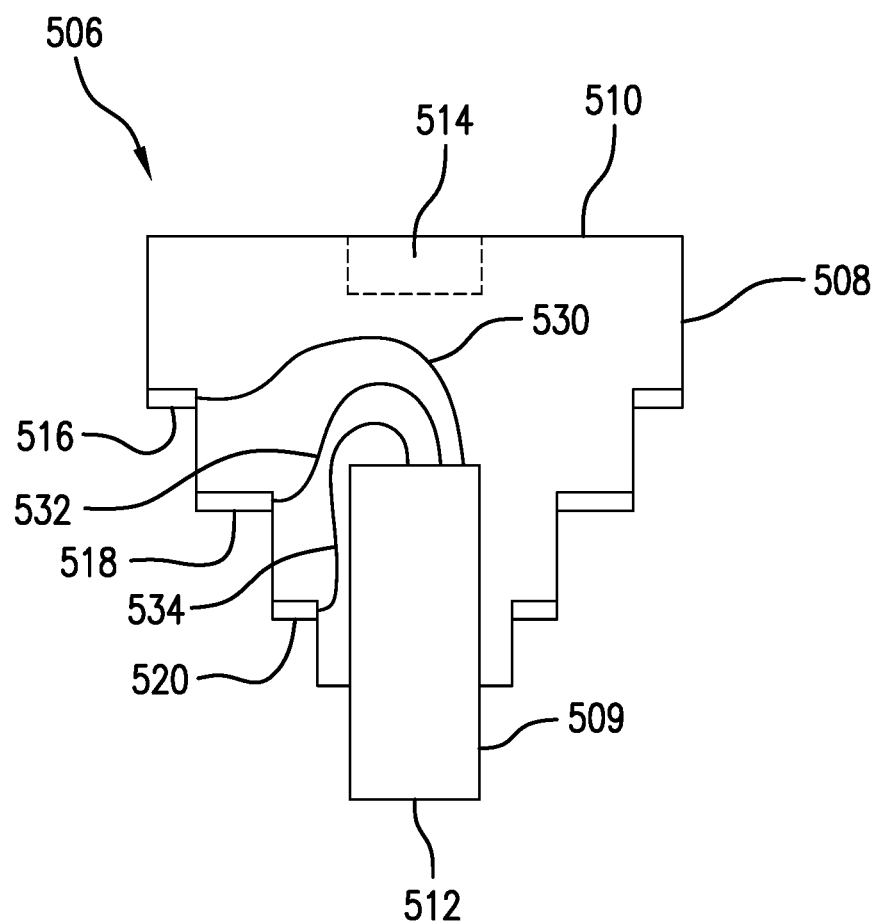
FIG. 2C is an elevational view of an LRU vibration sensor in accordance with another embodiment of the present invention.
Figure 2D:
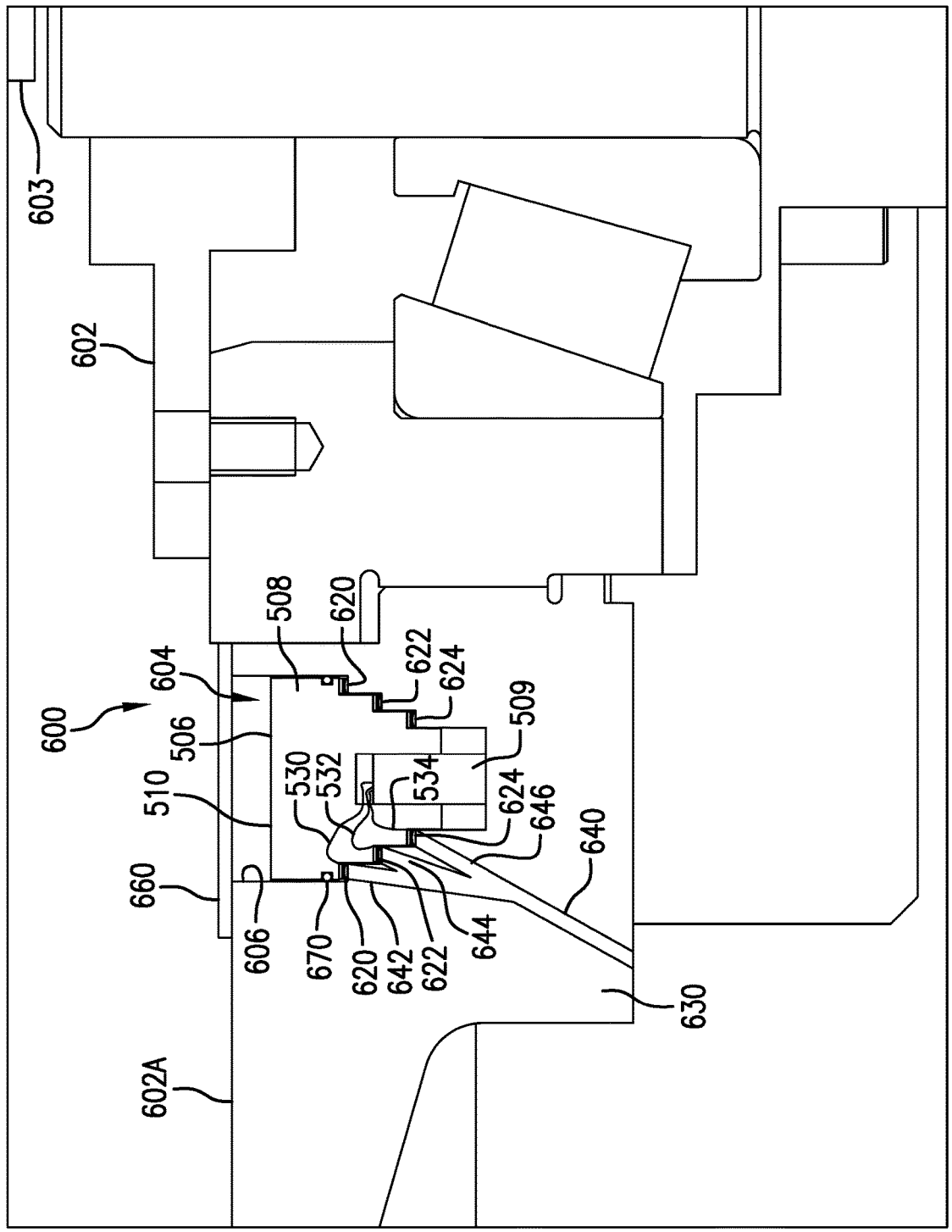
FIG. 2D is a partial, elevational view of a motor having an LRU sensor system in accordance with one embodiment of the present invention, the LRU sensor system using the LRU vibration sensor shown in FIG. 2C, the view showing the interior of the motor and the location of the LRU sensor system.

Referring to FIG. 2C, there is shown Vibration LRU sensor 506 in accordance with another embodiment of the present invention. Vibration LRU sensor 506 is configured to be removably secured or positioned within a socket or female receptacle in a casing of a motor. Such a configuration is shown in FIG. 2D and is discussed in the ensuing description. LRU sensor 506 comprises sensor head section 508 and sensing section 509. Vibration LRU sensor 506 includes top end 510 and bottom end 512 similar to FIG. 2A. Sensor head section 508 has a stepped design configuration that provides different sections, each of which having a cylindrical shape and a different diameter. Top end 510 has a recess 514 (shown in phantom) that is which is sized to receive a tool (e.g. hex drive) for installing or removing LRU sensor 506 from the socket in a machine casing (e.g. motor casing). LRU sensor 506 as described thus far can be realized by commercially available sensors. In accordance with the invention, LRU sensor 506 is configured to have electrically conductive members 516, 518 and 520 that are joined or attached to the exterior surface of sensor head section 508. Specifically, each electrically conductive member 516, 518 and 520 is joined or attached to a corresponding step of the stepped configuration of sensor head section 508. In one embodiment, electrically conductive members 516, 518 and 520 can be configured as raised terminal pins (see FIG. 1A). In another embodiment, each electrically conductive member 516, 518 and 520 is configured as a circular, electrically conductive member that has a central opening having a predetermined diameter that allows it to be fitted over the section of sensor head section 508 that fits within the predetermined diameter. Electrical wires 530, 532 and 534 extend from sensing section 509 and are electrically connected to electrically conductive members 516, 518 and 520, respectively. Electrical wires 530, 532 and 534 can provide electrical power and ground, and a signal path for signals outputted sensing section 509.

It is to be understood that the particular shapes and configurations of LRU sensor 506 and electrically conductive members 516, 518 and 520 pertain to just one embodiment and that LRU sensor 506 and electrically conductive members 516, 518 and 520 may have other shapes and configurations. Furthermore, LRU sensor 506 may be configured to have more or less than three electrically conductive members.

Referring to FIG. 2D, there is shown motor 600 which has housing 602. Housing 602 includes top cover 602A. Motor 600 further includes shaft 603, a rotor and stator assembly. The rotor and stator assembly are not shown but are well known in the art. Motor 600 includes socket or female receptacle 604 that is in cover 602A. LRU piezoelectric vibration sensor 506, previously described in the foregoing description, is removably disposed in socket 604. In this embodiment, socket 604 is configured so as to correspond to the shape and configuration of LRU sensor 506. Socket 604 includes inner wall 606 which has a stepped configuration that is complementary to the stepped configuration of sensor head section 508 of LRU sensor 506. Socket 604 includes electrically conductive members 620, 622 and 624, each of which being attached or joined to a corresponding step of inner wall 606. Electrically conductive members 620, 622 and 624 of socket 604 contact electrically conductive members 516, 518 and 520, respectively, of LRU sensor 506. Motor 600 includes has cavity 630 and wireway 640 that is located in cavity 630. Wireway 640 has a plurality of electrical wires therein. Wireway 640 includes sections 642, 644 and 646. The electrical wires extend through wireway sections 642, 644 and 646. Wireway section 642 has an opening adjacent to electrically conductive member 620. The electrical wire in wireway section 642 is electrically connected to electrically conductive member 620. Wireway section 644 has an opening adjacent to electrically conductive member 622. The electrical wire in wireway section 644 is electrically connected to electrically conductive member 622. Similarly, wireway section 646 has an opening adjacent to electrically conductive member 624. The electrical wire in wireway section is electrically connected to electrically conductive member 624. The electrical wires carried by wireway 640 may be connected to electrical power or ground, or may provide a signal path for signals outputted by sensing section 509 of LRU sensor 506. LRU sensor 506 is completely accessible from outside the motor housing 602 and thus can be replaced without having to access cavity 630 of motor 600.

In one embodiment, wireway 640 is located in the gap between the stator coil end turns and motor casing 602.

Figure 2E:
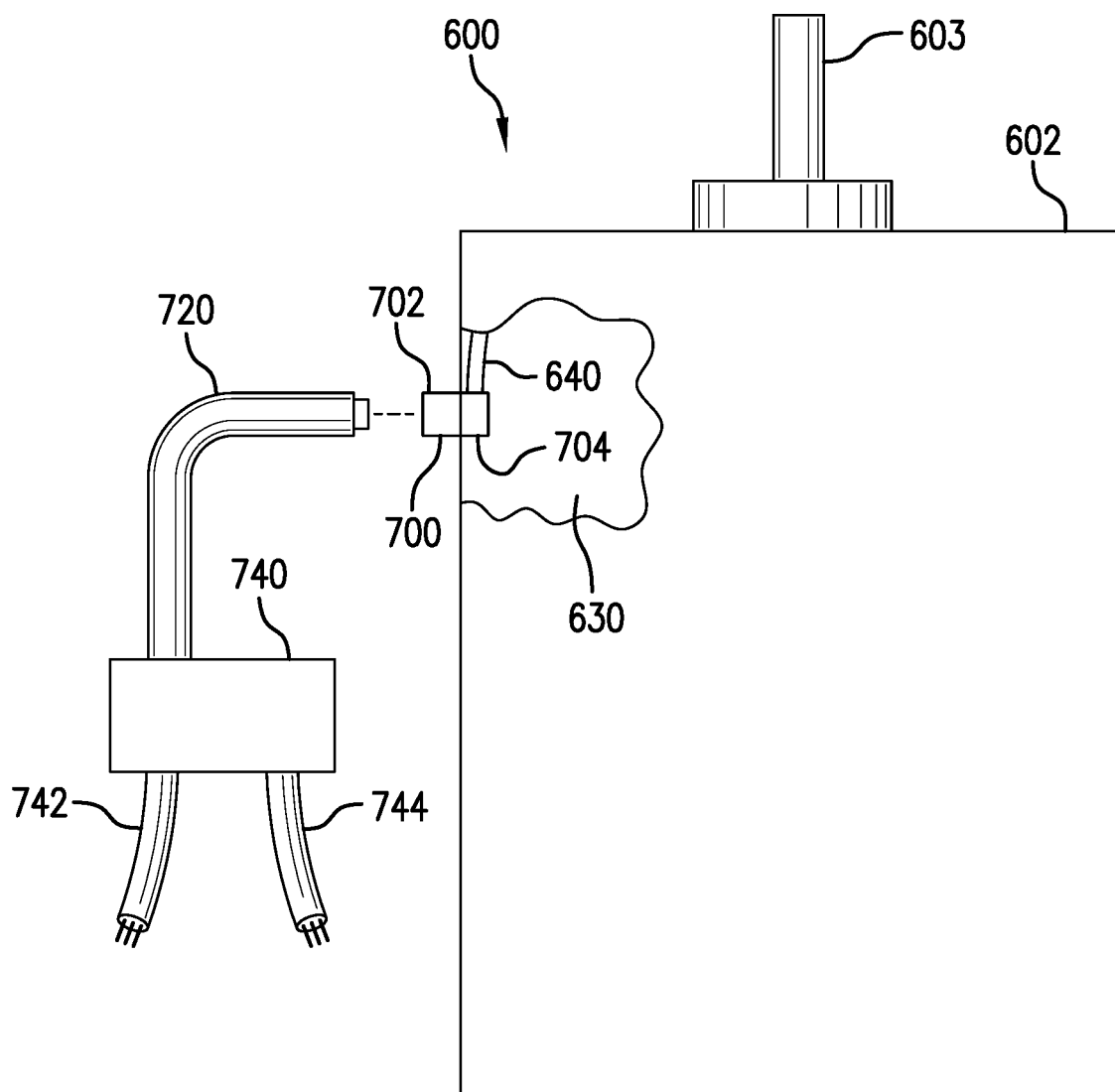
FIG. 2E is an elevational view of the motor of FIG. 2D, the view showing a portion of the interior of the motor and an electrical connector attached to the motor and in electrical signal communication with the LRU sensor system in accordance with one embodiment of the present invention.

In one embodiment, shown in FIG. 2E, motor 600 includes connector 700 attached to housing 602. Connector 700 comprises external electrical interface 702 and internal electrical interface 704. Internal electrical interface 704 is within motor cavity 630. The wires within wireway 640 are electrically connected to internal electrical interface 704. External cable 720, only partially shown, connects the external electrical interface 702 to external junction box 740. In the case of a wet cooling tower, junction box 740 may be positioned on the fan deck. External cable 742 is connected between junction box 740 and sensor signal processing equipment that amplifies, conditions and processes the sensor output signals (see FIG. 2B). External cable 744 provides electrical power for LRU sensor 506. In one embodiment, junction box 740 includes a signal amplifier that amplifies the signals outputted by LRU sensor 506. The amplified sensor output signals are then fed to cable 742. In one embodiment, electrical connector 700 is configured as a quick-disconnect electrical connector which is known in the art. Quick-disconnect electrical connectors are described in international patent application no. PCT/US2016/061244, entitled "Direct Drive Fan System With Variable Process Control" and published on Apr. 25, 2013 under International Publication No. WO 2013/059764. The entire disclosure of international patent application number PCT/US2016/061244 is hereby incorporated by reference.

In an alternate embodiment, cable 720 is not connected to external junction box 740 but instead, is electrically connected to a motor control enclosure (MCE) or a motor control center (MCC). Motor control enclosures and motor control centers are described in the aforementioned international patent application number PCT/US2016/061244.

Figure 2F:
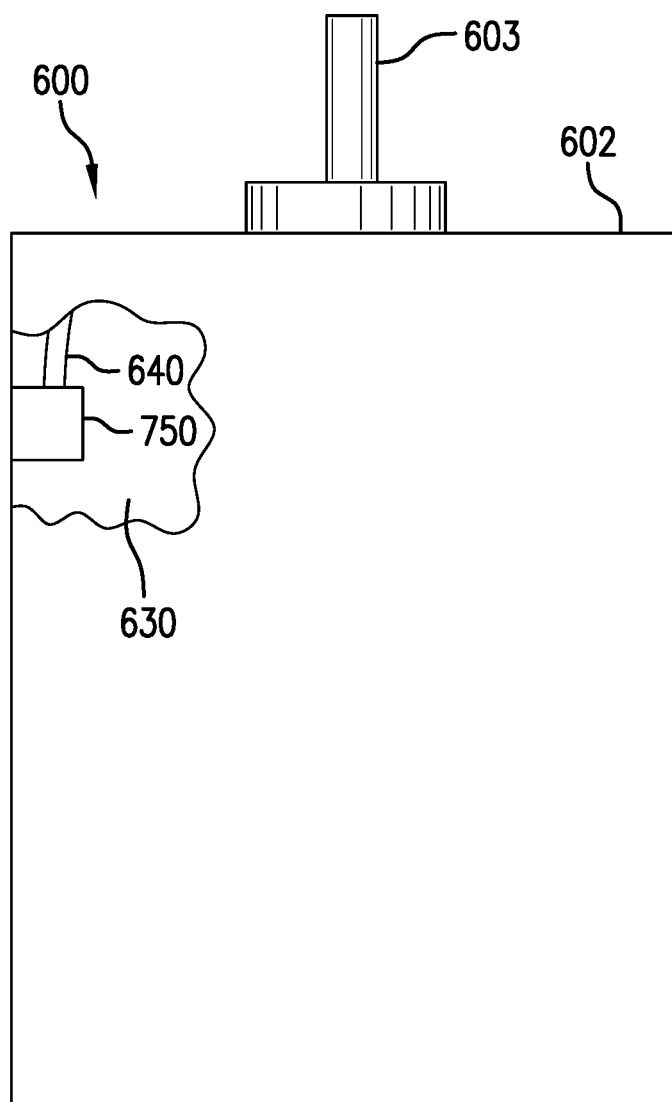
FIG. 2F is an elevational view of the motor of FIG. 2D, the view showing a portion of the interior of the motor and an internal junction box in electrical signal communication with the LRU sensor system in accordance with another embodiment of the present invention.

In one embodiment, as shown in FIG. 2F, motor 600 includes internal junction box 750 that is located in motor cavity 630. Internal junction box 750 can include electrical power conditioning devices (e.g. transformers) to provide power to the LRU sensor, batteries to power the LRU sensor, battery charging devices, generators, power transmission devices, sensor amplifiers, wireless communication devices and instrumentation termination blocks. For example, internal junction box 750 may contain amplifier 454, computer 456 and VFD 464 shown in FIG. 2B. The wires in wireway 640 are fed into internal junction box 750 such that the electrical power wires for LRU sensor 506 are connected to a power conditioning device, battery or power transmission device, and the wires in wireway 640 that carry the sensor output signals are fed to sensor amplifiers, signal processors or wireless communication devices.

In another embodiment, a generator (not shown) is located in the motor cavity 630 or on or about the motor. The electrical power generated by the motor shaft and is used to power the LRU sensor and other components at a different voltage than that being supplied to power the motor thus eliminating a transformer.

In a preferred embodiment, each electrically conductive member 620, 622 and 624 is configured to be a complementary mating connector that mates with electrically conductive members 516, 518 and 520, respectively. For example, in one embodiment, each electrically conductive member 516, 518 and 520 is configured as a raised terminal pin (see FIG. 1B) and each electrically conductive member 620, 622 and 624 is configured as a female receptacle (see FIG. 1B). In another embodiment, each electrically conductive member 516, 518, 520, 620, 622 and 624 is configured as a raised terminal pin (see FIG. 1A). In a further embodiment, each electrically conductive member 516, 518 and 520 is configured as a terminal pin shown in FIG. 1D and each electrically conductive member 620, 622 and 624 is configured as the female receptacle shown in FIG. 1D. However, it is to be understood that electrically conductive members 516, 518 and 520 and electrically conductive members 620, 622 and 624, respectively, can be realized by any of the terminal pairs and electrical interfaces shown in FIGS. 1A-1J as well as any other suitable terminal pairs and electrical interfaces.

It is to be understood that the particular shapes and designs of LRU sensor 506 and socket 604 shown in FIG. 2D pertain to just one embodiment and such configurations and designs may be modified depending upon the particular application or motor design.

Any suitable technique can be used to lock and index LRU sensor 506 within socket 604. For example, in one embodiment, a "push and twist" configuration is used to lock and index LRU sensor 506 within socket 604. In another embodiment, LRU sensor 506 has threads thereon and inner wall 606 of socket 604 has complementary threads thereon to allow LRU sensor 506 to be screwed into socket 604. In a further embodiment, a mechanical capture mechanism such as a bolt or screw fastener is used to lock and index LRU sensor 506 within socket 604.

Figure 5:
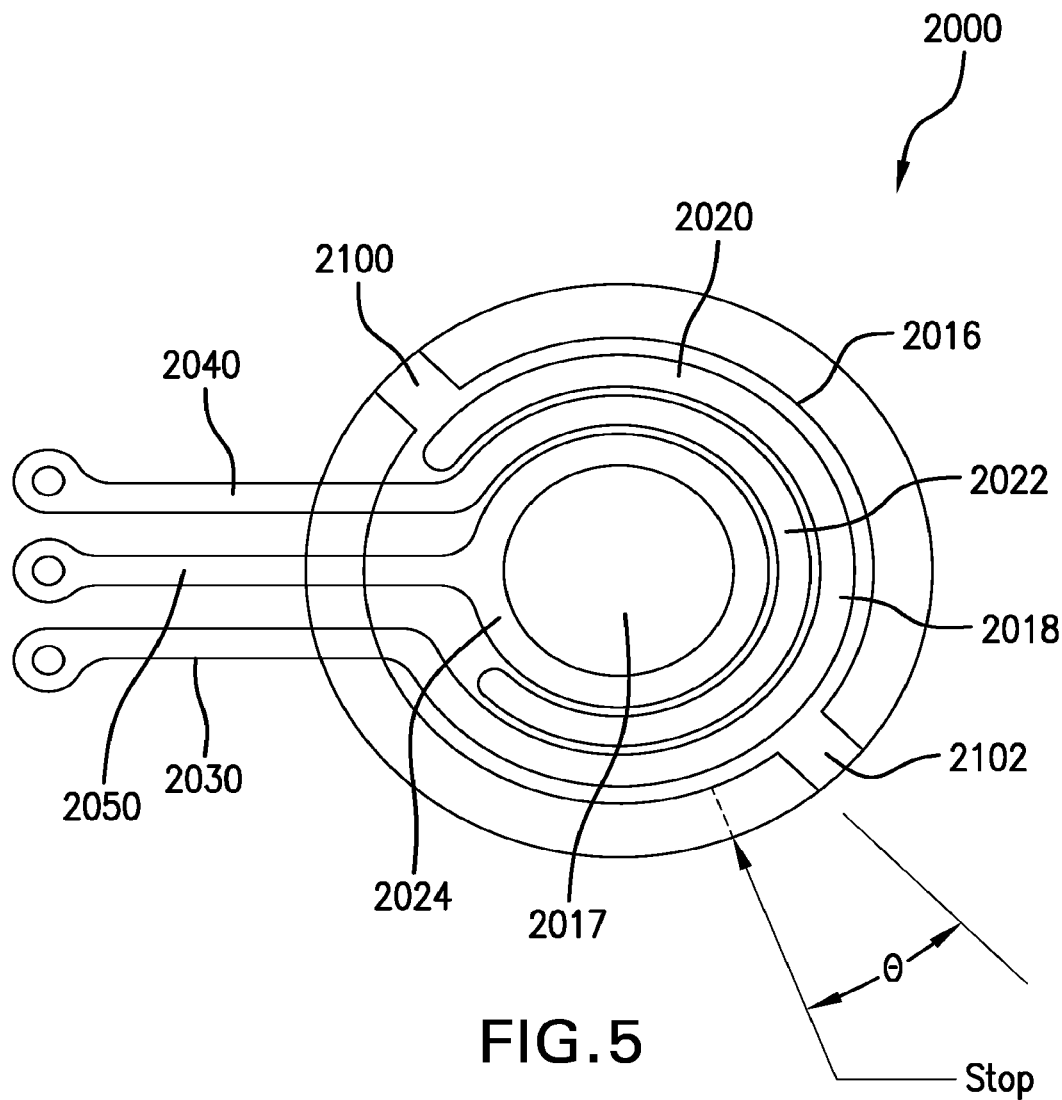
FIG. 5 is a diagram showing a plan view of an LRU sensor socket and corresponding printed circuit in accordance with another embodiment of the present invention.

In a further embodiment, LRU sensor 506 includes a pair of insert tabs which are similar to the insert tabs described with respect to the embodiment of FIG. 5, and inner wall 606 of socket 604 includes grooves that are similar to grooves 2100 and 2102 which are also discussed with respect to the embodiment of FIG. 5. In this embodiment, LRU sensor 506 can be installed and indexed in one way only. The user can only rotate the LRU sensor 506 in one direction to install and index the LRU sensor 506 in the socket 604 and then rotate LRU sensor 506 in the opposite direction to unlock and remove LRU sensor 506 and prevent misalignment of the assembly.

Referring to FIG. 2D, in one embodiment, motor 600 includes primary cover 660 that is removably attached to housing 602. Primary cover 660 includes a seal (not shown) attached to the underside thereof which prevents moisture, water and contaminants from entering motor socket 604. The seal attached to primary cover 660 can be configured as an O-ring type seal. In one embodiment, inner wall 606 of socket 604 has a groove formed therein and a secondary seal 670 is positioned in the groove. Secondary seal 670 prevents moisture, fluids and other contaminants from entering socket 604. Secondary seal 670 can be configured as an O-ring seal.

Secondary seal 670 can include a wiper gasket to further prevent contaminants from entering socket 604.

In an alternate embodiment, LRU sensor 506 is configured to have a groove in the exterior surface of sensor head section 508 and an O-ring seal positioned in the groove to prevent moisture, fluids and other contaminants from entering socket 604.

In an alternate embodiment, motor 600 includes a secondary cover and seal that is positioned beneath primary cover 660 and directly over socket 604 to protect the entire LRU sensor system from impact, contamination and moisture. This embodiment can be implemented when LRU sensor 506 is completely recessed in the socket or female receptacle (see FIG. 1I).

Figure 3:
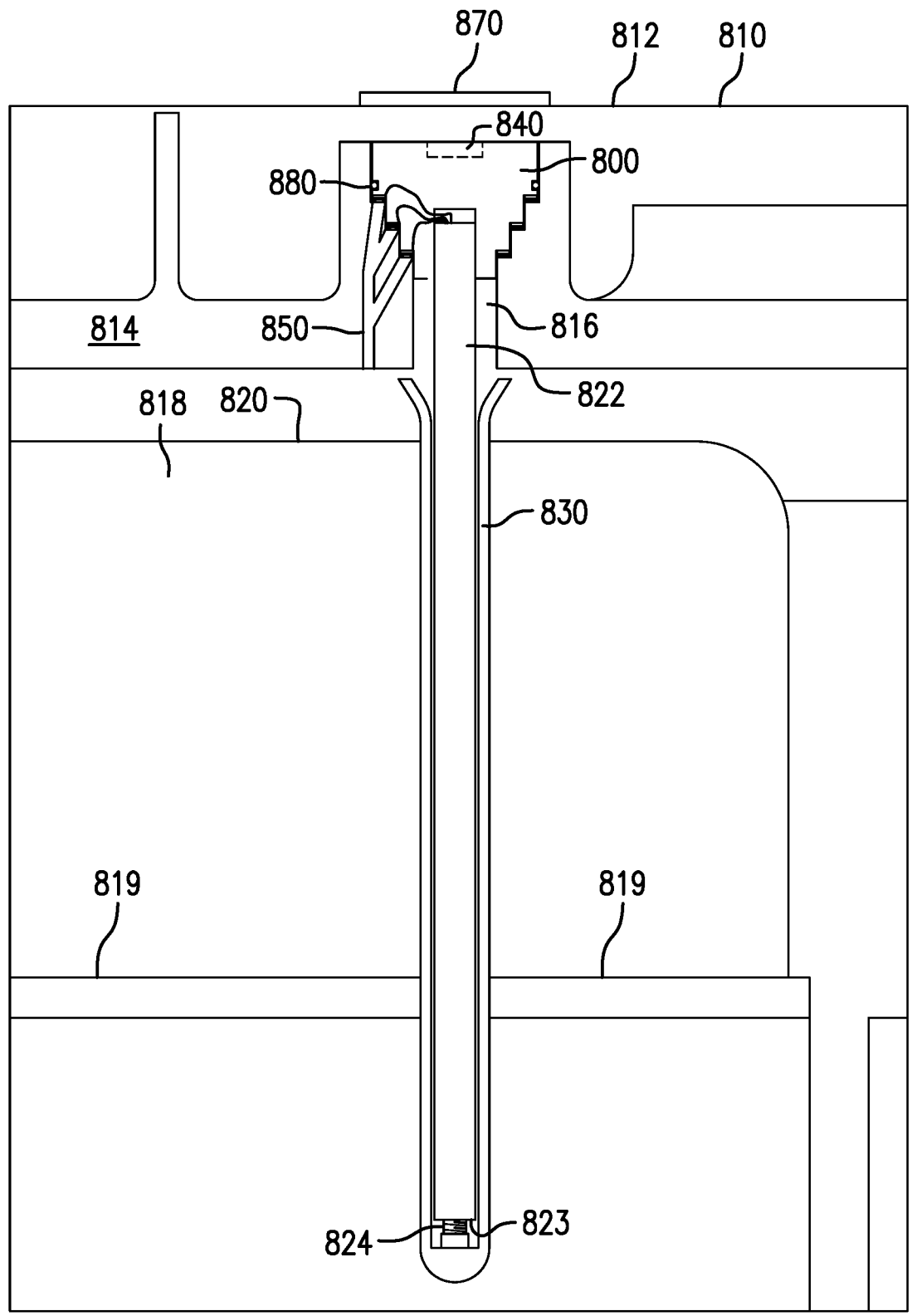
FIG. 3 is a partial, elevational view of a motor having an LRU sensor system in accordance with another embodiment of the present invention, the view showing the interior of the motor and the location of the LRU sensor system.

Referring to FIG. 3, there is shown a LRU sensor system in accordance with another embodiment of the present invention. In this embodiment, the LRU sensor system comprises a vertical temperature LRU sensor 800. The LRU sensor 800 may be configured as any suitable temperature sensor device, including but not limited to resistance temperature detectors (RTD), thermocouple sensors and infrared or optical devices for sensing magnet temperatures on a moving rotor. In this embodiment, motor 810 has casing 812, cavity 814 and socket or female receptacle 816 in casing 812. In accordance with the invention, LRU sensor 800 can be easily replaced without removing motor 810 from service and without needing access to the cavity 814. FIG. 3 shows only a portion of motor 810. Motor 810 includes coil 818 and laminations 819. Coil 818 has end turns 820. Socket 816 has the same stepped configuration as socket 604 (see FIG. 2D) and therefore has a plurality of steps or shoulders to which are joined or attached electrically conductive members that are part of the electrical interface with LRU sensor 800. LRU sensor 800 has generally the same structure as LRU sensor 506 except that sensing section 509 is replaced by elongated probe section 822 that has a predetermined length. In accordance with this embodiment of the invention, thermal well 830 is embedded into coil 818 and then LRU sensor 800 is inserted into socket 816 such that probe section 822 is inserted into thermal well 830. Thermal well 830 provides electrical insolation between probe section 822 and coil 818 and laminations 819. Sensor probe 822 is calibrated accordingly to compensate for thermal well 830. Probe section 822 has end 823 to which a stop-end member 824 is attached or joined. Stop-end member 824 provides support and prevents movement of probe section 822. In another embodiment, stop-end member 824 includes a spring member so as to provide a degree of tension when LRU sensor 800 is completely inserted into socket 816.

It is to be understood that thermal well 830 can be formed in other motor components, such as within laminations 819, when temperate sensing is required. Wireway 850 functions in the same manner as wireway 640 shown in FIG. 2D. Wireway 850 can located in any one of a variety of suitable locations. For example, wireway 850 can be located in the gap between the coil end turns 820 and the interior wall (not shown) of casing 812.

The length of probe section 822 can be varied depending upon the particular motor components, their location within motor cavity 814 and the portion of the motor component in which temperature information is required.

Figure 4:
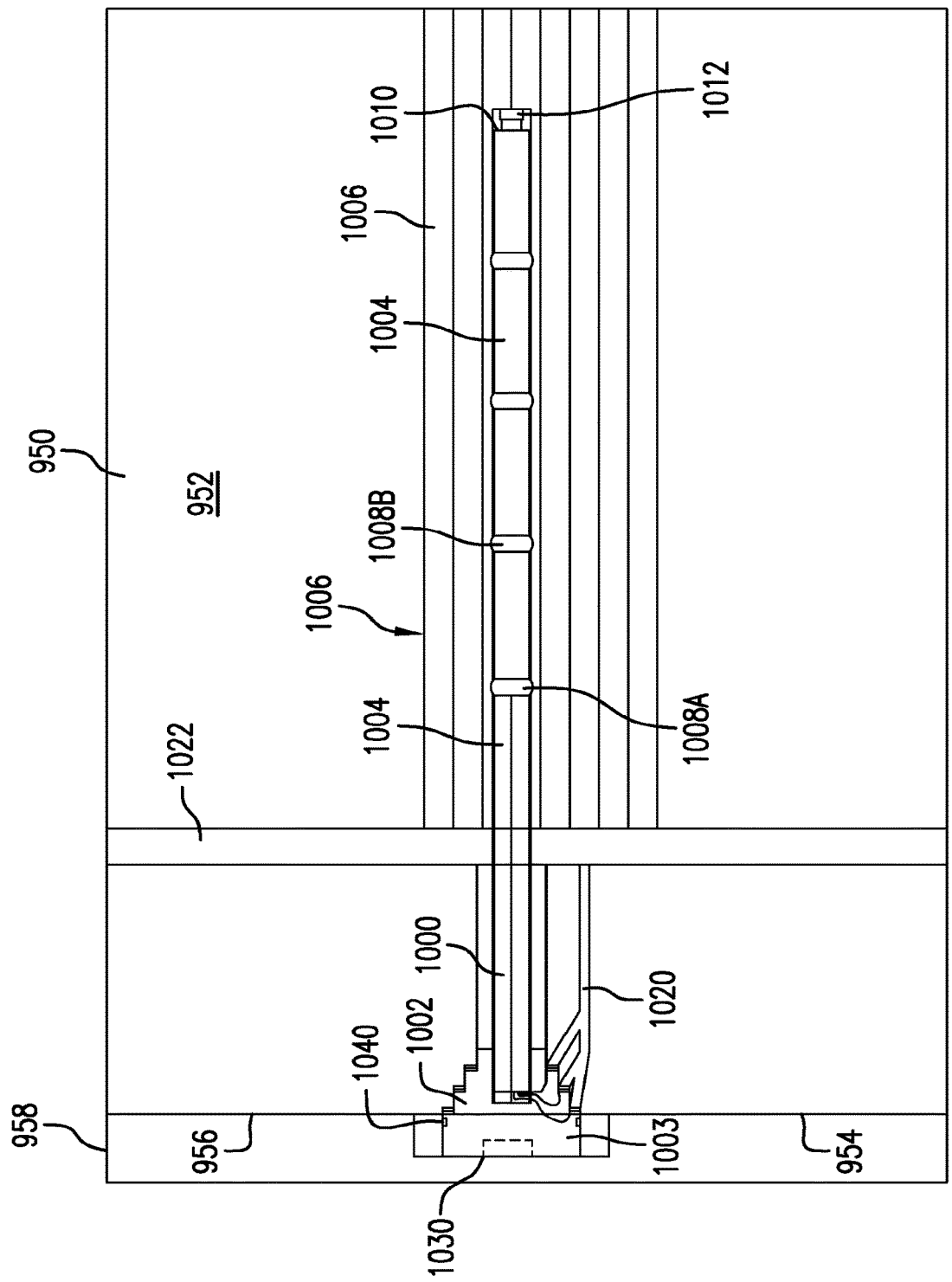
FIG. 4 is a partial, elevational view of a motor having an LRU sensor system in accordance with another embodiment of the present invention, the view showing the interior of the motor and the location of the LRU sensor system.

In an alternate embodiment, probe section 822 is replaced by a probe that measures temperature at various locations on the length of the probe having a similar structure as probe section 1004 shown in FIG. 4 and discussed in the ensuing description.

In an alternate embodiment, LRU sensor 800 is configured with an infrared sensor for measuring the temperature of the rotating magnets on the rotor and therefore does not require electrical isolation and thermal well 830.

Any of the terminal pairs and electrical interfaces shown in FIGS. 1A-1J as well as any other suitable terminal pairs and electrical interfaces may be used to realize the electrical interface between LRU sensor 800 and socket 816.

It is to be understood that the particular shapes and designs of LRU sensor 506 and socket 604 shown in FIG. 2D pertain to just one embodiment and such configurations and designs may be modified depending upon the particular application or motor design.

In another embodiment, the electrical power for LRU sensor 800 and the signal path for the sensor output signals may be realized by the quick-disconnect electrical connector shown in FIG. 2E.

In a further embodiment, the electrical power for LRU sensor 800 and the signal path for the sensor output signals may be realized by the internal junction box shown in FIG. 2F.

In an alternate embodiment, LRU sensor 800 is a wireless sensor and motor 810 includes a receiver or transceiver that receives and transmits the wireless signals from the LRU wireless sensor, conditions these wireless signals and then feeds these conditioned signals into the internal wiring network of the motor. These conditioned signals can then be sent from the motor using the configuration shown in FIG. 2E to external processing equipment such as a cloud on the internet or a Motor Control Center (MCC).

In an alternate embodiment, LRU sensor 800 is an optical sensor. In another embodiment, LRU sensor 800 is a fiber optic sensor. In a further embodiment, LRU sensor 800 is an infrared sensor.

LRU sensor 800 includes tool recess 840, shown in phantom, which provides the same function as recess 514 in LRU sensor 506. Cover 870 is removably attached to casing 812 and has the same structure, purpose and function as cover 660 shown in FIG. 2D. Cover 870 may include a seal attached to the underside thereof. Seal 880, located in socket 816, has the same structure, purpose and function as seal 670 shown in FIG. 2D.

Any suitable technique can be used to lock and index LRU sensor 800 within socket 816. For example, in one embodiment, a "push and twist" configuration is used to lock and index LRU sensor 800 within socket 816. In another embodiment, LRU sensor 800 has threads thereon and the inner wall of socket 816 has complementary threads thereon to allow LRU sensor 800 to be screwed into socket 816. In a further embodiment, a mechanical capture mechanism such as a bolt or screw fastener is used to lock and index LRU sensor 800 within the socket 816.

In a further embodiment, LRU sensor 800 has insert tabs that are similar to the insert tabs described with respect to the embodiment shown in FIG. 5, and the inner wall of the socket 816 has the groove formations which are described in the ensuing description related to the embodiment of FIG. 5. In this embodiment, LRU sensor 800 can be installed and indexed in one way only. The user can only rotate the LRU sensor 800 in one direction to install and index the LRU sensor 800 in socket 816, and then rotate LRU sensor 800 in the opposite direction to unlock and remove LRU sensor 800.

Referring to FIG. 4, there is shown an LRU sensor system in accordance with another embodiment of the invention. This drawing figure shows only a portion of motor 950 with which this LRU sensor system is used. Motor 950 includes motor cavity 952 and casing 954. Casing 954 has exterior surface 956 and a plurality of fins 958 radially extending from exterior surface 956. In this embodiment, the LRU sensor system comprises LRU sensor 1000 which comprises sensor head section 1002, which is substantially the same in construction and configuration as sensor head section 508 of LRU sensor 506 (see FIG. 2D), and probe section 1004 which is connected to sensor head section 1002. Sensor head section 1002 includes section 1003 that has recess 1030 for receiving an installation tool to allow the LRU sensor 1000 to be installed or removed. Sensor head section 1002 is positioned within a socket or female receptacle in motor casing 954. LRU sensor 1000 is in a horizontal orientation wherein probe section 1004 is embedded in the stacked laminations 1006 of motor 950. Probe section 1004 comprises a plurality of temperature sensing devices 1008A-D. Each temperature sensing device 1008A-D can be configured as a thermocouple or resistance temperature detector (RTD). Each temperature sensing devices 1008A-D senses the temperature at a particular location or point on the stacked laminations 1006. Sensing devices 1008A-D sense or measure a plurality of temperatures simultaneously at multiple points throughout the stacked laminations 1006. Probe section 1004 includes wires (not shown) that are connected to corresponding temperature sensing devices 1008A-D. Similar to LRU sensor 506, LRU sensor 1000 includes electrically conductive members that are attached or joined to the steps or shoulders of sensor head section 1002 similar to electrically conductive members 516, 518 and 520 of LRU sensor 506 (see FIG. 2C). The wires in probe section 1004 are electrically connected to the electrically conductive members of sensor head section 1002 in the same manner that sensor wires 532, 534 and 534 are electrically connected to electrically conductive members 516, 518 and 520, respectively, of LRU sensor 506. The socket in motor casing 954 has the same structure as socket 604 (see FIG. 2D) and thus has a stepped configuration that defines steps or shoulders. Each step or shoulder has an electrically conductive member attached or joined thereto which contacts corresponding electrically conductive members that are on sensor head section 1002. Probe section 1004 includes end 1010 and stop end member 1012 that is attached to end 1010. Stop-end member 1012 provides support and prevents movement of probe section 1004. In another embodiment, stop-end member 1012 includes a spring member so as to provide a degree of tension when LRU sensor 1000 is completely inserted into the socket. Wireway 1020 has the same structure and function as wireway 640 shown in FIG. 2D. In this embodiment, wireway 1020 is in communication with main internal wireway 1022. Wires (not shown) in main wireway 1022 can be fed to a quick-disconnect electrical connector as shown in FIG. 2E or to an internal junction box as shown in FIG. 2F. Any of the electrical interface configurations shown in FIGS. 1A-1J and 2D may be used to realize the electrical interface between LRU sensor 1000 and the socket in motor casing 956.

In one embodiment, section 1003 of sensor head section 1002 protrudes above exterior surface 956 of motor casing 954. Seal 1040 has the same configuration and function as seal 670 shown in FIG. 2D and creates a seal between sensor section 1002 and the inner wall of the casing. In another embodiment, an external cover, not shown but substantially the same as 660 shown in FIG. 2D, is removably attached to exterior surface 956 of motor casing 954 to provide further protection for LRU sensor 1000 and to prevent moisture and contaminants from entering the socket. In one embodiment, sensor section 1000 and the socket in motor 950 are configured to implement a "twist and lock" function whereby a user inserts LRU sensor 1000 into the socket so that probe section 1004 is inserted between the laminations 1006 and then the user uses a tool to twist or rotate LRU sensor 1000 a predetermined angular displacement (e.g. 24°) so as to lock LRU sensor 1000 in place.

In a further embodiment, LRU sensor 1000 has insert tabs that are similar to the insert tabs described with respect to the embodiment shown in FIG. 5, and the inner wall of the socket in casing 954 has the groove formations that are also described in the ensuing description with respect to the embodiment of FIG. 5. In this embodiment, LRU sensor 1000 can be installed and indexed in one way only. The user can only rotate the LRU sensor 1000 in one direction to install and index LRU sensor 1000 in the socket, and then rotate the LRU sensor 1000 in the opposite direction to unlock and remove LRU sensor 1000.

In an alternate embodiment, a thermal well, similar to thermal well 830 described in the foregoing description, is used with LRU sensor 1000. In such an embodiment, the thermal well is inserted into laminations 1006 and probe section 1004 is inserted into the thermal well. The thermal well electrically isolates probed section 1004 from laminations 1006.

In an alternate embodiment, LRU sensor 1000 is an optical sensor. In another embodiment, LRU sensor 1000 is a fiber optic sensor. In a further embodiment, LRU sensor 1000 is an infrared sensor and is comprised of a material that electrically isolates the probe from the motor and eliminates the need for a thermal well.

Referring to FIG. 5, there is shown a diagram which shows a plan view of an LRU sensor socket 2000 and corresponding printed circuit in accordance with another embodiment of the present invention. This view looks into LRU sensor socket 2000. Socket 2000 has an inner wall 2016 which is described in detail in the ensuing description. Socket 2000 has central opening 2017 through which a portion of an LRU sensor extends. Socket 2000 is sized to receive an LRU sensor (not shown). The LRU sensor that can be used with socket 2000 can be a sensor to sense vibrations, gas, temperature or airflow. The printed circuit comprises three discrete electrically conductive circuits 2020, 2022 and 2024 that coincide and directly interface with the terminals on a LRU sensor that is installed in socket 2000 and properly indexed. Circuits 2020, 2022 and 2024 provide power, communication and grounding for the LRU sensor. Circuits 2020, 2022 and 2024 have extending portions 2030, 2040 and 2050, respectively, that extend away from socket 2000 for a predetermined distance. Each extending portion 2030, 2040 and 2050 may be terminated at a corresponding terminal (not shown) which may be in the motor cavity or in the top cover of the motor housing. In such an embodiment, individual wires of a multi-strand cable can be attached to the terminals. In a preferred embodiment, the printed circuit is formed on an electrically insulating substrate such as silicone. In one embodiment, circuits 2020, 2022 and 2024 are formed on a printed circuit board. Circuits 2020, 2022 and 2024 can be directly electrically connected to the internal motor wireway. Circuits 2020, 2022 and 2024 can be located in motor housing, such as the top cover of the motor housing.

Socket 2000 is configured to work with an LRU sensor that has electrical conductors formed on the bottom of the sensor head. These electrical conductors are arranged so that they are the mirror image of circuits 2020, 2022 and 2024 such that when the LRU sensor is completely installed and properly indexed in socket 2000, the electrical conductors on the bottom of the sensor head contact circuits 2020, 2022 and 2024.

Referring to FIG. 5, socket 2000 and its corresponding LRU sensor are configured to implement a "turn and lock" or "rotate and lock" function. The LRU sensor (not shown) includes diametrically positioned insert tabs that are sized to fit into corresponding downwardly extending grooves or slots 2100 and 2102 formed in inner wall 2016 of socket 2000. Inner wall 2016 also has a pair of relatively shorter grooves that extend along the circumference of the socket inner wall either in a clockwise direction or counter-clockwise direction. In a preferred embodiment, both shorter grooves extend in a clockwise direction. Each shorter groove starts at the bottom of a corresponding downwardly extending groove. In one embodiment, the length of each of the shorter grooves translates to an angle θ of 24° along the circumference of the socket inner wall. In order to install the LRU sensor, the user aligns each insert tab on the LRU sensor with a corresponding one of grooves 2100 and 2102. Once each insert tab enters the corresponding groove 2100 or 2102, the user then moves the LRU sensor downward until the insert tabs reach the end of grooves 2100 and 2102. The user then rotates LRU sensor 2000 clockwise such that the each insert tab enters a corresponding shorter groove. The insert tabs continue to move along the shorter grooves until the insert tabs reach the end of the shorter grooves. Once this occurs, the LRU sensor is locked in place and properly indexed. In one embodiment, the length of the shorter grooves translates to about 24° in the clockwise direction. In order to remove the LRU sensor from socket 2000, the user rotates the LRU sensor in the counter-clockwise direction (e.g. 24°) and then lifts the LRU sensor upward so that insert tabs move upward through grooves 2100 and 2102. Similar to the other embodiments described in the foregoing description, the LRU sensor is configured with a recess sized to receive a tool which allows a user to rotate the LRU sensor when it is positioned in socket 2000.

Figure 6:
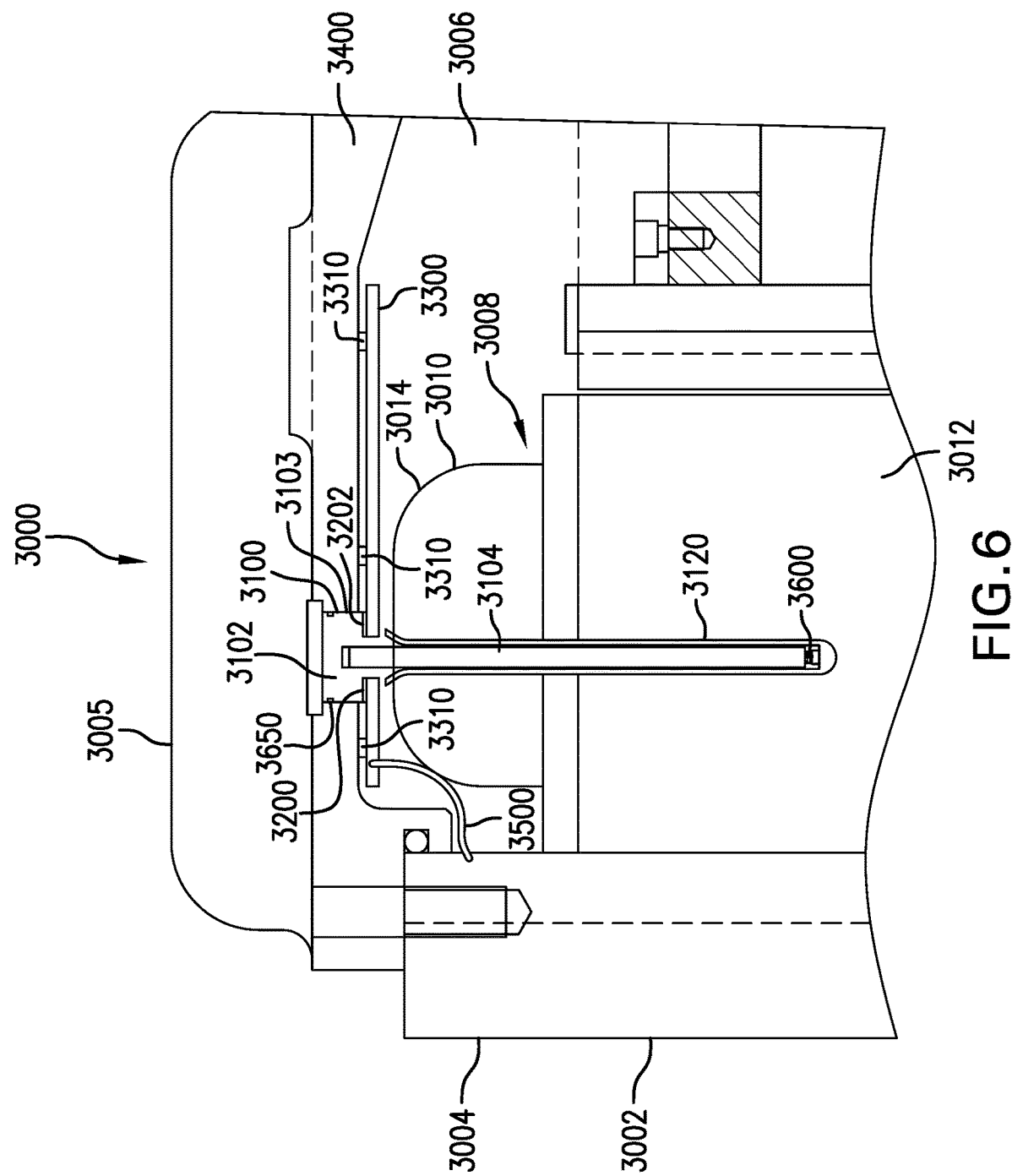
FIG. 6 is a partial, elevational view of a motor having an LRU sensor system in accordance with another embodiment of the present invention, the view showing the interior of the motor and the location of the LRU sensor system.

Referring to FIG. 6, there is shown LRU sensor system that uses a printed circuit interface in the same manner as shown in FIG. 5. Apparatus 3000 can be a motor, compressor, turbine, pump or similar machines. Apparatus 3000 comprises casing 3002. Casing 3002 comprises exterior surface 3004 and cover 3005. Apparatus 3000 includes cavity or interior 3006. In this particular embodiment, apparatus 3000 is a motor that includes stator 3008. Stator 3008 comprises coils 3010 and stator core 3012. Coils 3010 are wrapped about stator core 3012 and have coil end turns 3014. Casing 3002 includes a socket that is configured for receiving LRU temperature sensor 3100. Sensor 3100 includes sensor head section 3102 and sensor probe section 3104 that is joined or attached to sensor head section 3102. Sensor head section 3102 has exterior surface 3103. Sensor section head 3102 is positioned in the socket in casing 3002. LRU sensor 3100 is used with thermal well 3120. The thermal well 3120 extends through the coil end turns 3014 and into stator core 3012. The thermal well 3120 has the same structure as thermal well 830 shown in FIG. 3. Thermal well 3120 electrically isolates sensor probe section 3104 from stator coils 3010 and stator core 3012. Sensor probe 3104 is disposed within thermal well 3120 and measures or senses the temperature in stator core 3012. LRU sensor 3100 includes electrical conductors 3200 and 3202 that are joined or attached to the bottom of sensor head section 3102. Electrical wires (not shown) electrically connect the sensor probe 3104 to electrical conductors 3200 and 3202. The LRU sensor system includes electrical circuit board 3300 which is attached to interior motor structure 3400. Electrical circuit board 3300 is electrically isolated from interior motor structure 3400. Insulators 3310 allow electrical circuit board 3300 to be attached to interior motor structure 3400 while keeping electrical circuit board 3300 electrically isolated from the interior motor structure 3400. Electrical circuit board 3300 comprises corresponding electrical conductors that contact the electrical conductors 3200 and 3202 attached to the bottom of LRU sensor head section 3102 when the LRU sensor 3100 is properly installed and indexed in the socket. Wires and cables (not shown) are electrically connected to electrical circuit board 3300 and extend through wireway 3500. The wires in wireway 3500 may be electrically connected to an electrical connector similar to electrical connector 700 shown in FIG. 2E or to an internal junction box similar to junction box 750 shown in FIG. 2F. In one embodiment, electrical conductors 3200 and 3202 are configured as printed circuit terminals and the corresponding electrical conductors of electrical circuit board 3300 are configured as complementary mating printed circuit terminals. Any of the techniques and configuration described in the foregoing description may be used to insert and lock LRU sensor 3100 in the socket. LRU sensor 3100 may be installed or removed without having to remove the motor and without needing access to the interior of the motor In alternate embodiments, any of the electrical interface configurations shown in FIGS. 1A-1J and 2D may be used to realize the electrical interface between electrical conductors 3200 and 3202 and the electrical conductors on printed circuit board 3300.

Sensor probe section 3104 includes stop end member 3600 which has the same structure and function as stop end member 824 shown in FIG. 3.

As shown in FIG. 6, cover 3005 covers LRU sensor 3100 and the socket so as to prevent moisture and contaminants from entering the socket. Cover 3005 has an underside and may include a seal or gasket attached or joined to the underside.

As shown in FIG. 6, seal 3650 is joined or attached to either the inner wall of the socket or to exterior surface 3103 of sensor head section 3102. Seal 3650 performs the same function as seal 670 shown in FIG. 2D.

Figure 7:
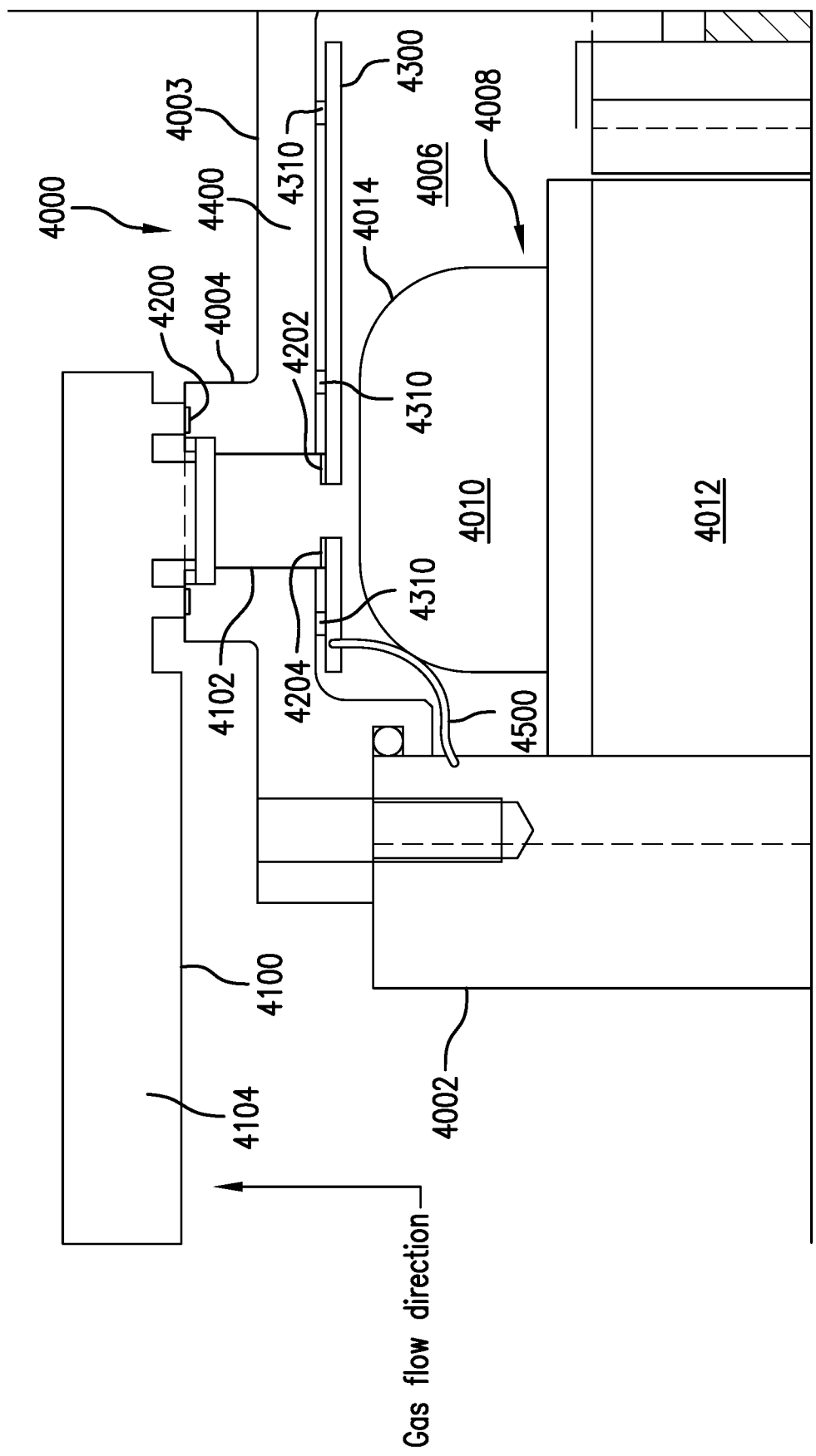
FIG. 7 is a partial, elevational view of a motor having an LRU sensor system in accordance with another embodiment of the present invention, the view showing the interior of the motor and the location of the LRU sensor system.

Referring to FIG. 7, there is shown another LRU sensor system that uses a printed circuit interface in the same manner as shown in FIG. 5. Apparatus 4000 can be a motor, compressor, turbine, pump or similar machines. In this embodiment, apparatus 4000 is a motor. Motor 4000 comprises casing 4002. Casing 4002 comprises motor cover 4003 and mounting boss 4004. Mounting boss 4004 has a socket or female receptacle, the purpose of which is discussed in the ensuing description. Motor 4000 includes cavity or interior 4006 and stator assembly 4008. Stator assembly 4008 comprises coils 4010 and stator core 4012. Coils 4010 are wrapped about stator core 4012 and have coil end turns 4014. Motor 4000 includes top mounted LRU gas sensor 4100. LRU gas sensor 4100 is a single piece unit and comprises connector head section 4102 and gas sensor section 4104. LRU gas sensor 4100 has a shape that is similar to the shape of a ratchet wrench. The female receptacle or socket in mounting boss 4004 and connector head section 4102 are configured to have structures that allow connection head section 4102 to be inserted into the socket in mounting boss 4004 and then rotated for a predetermined angular displacement (e.g. 24°) until connector head 4102 is locked in the socket. These aforementioned structures of the socket in mounting boss 4004 and connector head section 4102 are similar to the same configuration used to lock an LRU sensor in socket 2000 as shown in FIG. 5. Thus, in order to mount LRU gas sensor 4100 to motor 4000, a user maneuvers LRU gas sensor 4100 so that connector head 4102 is inserted into the socket in mounting boss 4004 and then rotates LRU gas sensor 4100 in a clockwise direction (e.g. 24°) until connector head 4102 is locked in place. When LRU gas sensor 4100 is indexed and completely mounted to motor 4000, gas sensor section 4104 is positioned in the airflow or airstream at a predetermined radius from the center of the cooling tower fan in order to sense gases such as hydrogen which present an explosive hazard.

Seal 4200 is attached or joined to the portion of gas sensor section 4104 that confronts mounting boss 4004 so that when LRU gas sensor 4100 is mounted to motor 4000, seal 4200 creates a seal that prevents moisture and contamination from entering the socket in mounting boss 4004. In one embodiment, seal 4200 is configured as an O-ring.

Electrically conductors 4202 and 4204 are joined or attached to the bottom of connector head section 4102. Electrical wires (not shown) internal to connector head section 4102 electrically connect gas sensor section 4104 to electrical conductors 4202 and 4204. In one embodiment, electrical conductors 4202 and 4204 may provide electrical power to LRU gas sensor 4100 or create a signal path for sensor output signals. If gas fumes enter gas sensor section 4104, the circuitry in gas sensor section 4104 detects the presence of gas and generates electrical signals that represents the measured amount of gas fumes. These electrical signals are fed to electrical conductors 4202 and 4204. The LRU sensor system includes electrical circuit board 4300 that is attached to but electrically isolated from interior motor structure 4400. Insulator members 4310 are used to attach electrical circuit board 4300 to interior motor structure 4400 but also electrically isolate electrical circuit board 4300 from interior motor structure 4400. Electrical circuit board 4300 includes corresponding electrical conductors that contact electrical conductors 4202 and 4204. Wires and cables (not shown) are electrically connected to electrical circuit board 4300 and extend through wireway 4500. The wires in wireway 4500 may be electrically connected to an electrical connector similar to electrical connector 700 shown in FIG. 2E or to an internal junction box similar to junction box 750 shown in FIG. 2F. In one embodiment, electrical conductors 4202 and 4204 are configured as printed circuit terminals and the corresponding electrical conductors of electrical circuit board 4300 are configured as printed circuits that will electrically interface with electrical conductors 4202 and 4204.

In an alternate embodiment, LRU gas sensor 4100 is screwed onto motor casing 4002 similar to mounting or screwing an oil filter onto an automobile engine. In such an embodiment, the screw and mounting arrangement determines the proper index for circuit continuity and airflow orientation. In other embodiments, other mounting arrangements include seals, index pins, screws, bolts and push/twist/lock configuration. In other embodiments, the LRU gas sensor is mounted on other locations on motor casing 4002.

In another embodiment, the LRU gas sensor is a wireless sensor which emits wireless signals that are received and coupled into the wiring network of the cooling tower and/or motor. In such an embodiment, the LRU gas sensor is mounted to the motor as described in the foregoing description and a receiver device is positioned within the motor cavity. The wireless signals from the LRU gas sensor are converted into digital signals which are then fed to other devices such as signal conditioners, digital acquisition devices, industrial computers and display devices such as monitors.

Other Embodiments of the LRU Sensor System of the Present Invention

It is to be understood that the terminal pairs and electrical interfaces shown in FIGS. 1A-1J are just examples and that any other suitable terminal pairs and electrical interfaces may be used to realize the electrical interface between LRU sensors and the internal wiring of a motor or other machine. Furthermore, it is to be understood that the shapes and sizes of the terminal pairs and electrical interfaces shown in FIGS. 1A-1J are just examples and that the terminal pairs and electrical interfaces may have other shapes and sizes.

In alternate embodiments, any of the foregoing LRU sensors may be hardwired to to either a wireway that is internal to the motor or a wireway that is external to the motor. An electrician may perform this task.

In an alternate embodiment, the LRU gas sensor is a wireless gas sensor but is not mounted on the motor but instead, is positioned at another location in the cooling tower and in contact with the airstream. The LRU gas sensor may be battery powered or receive electrical power via a hardwire connection with the cooling tower wiring network or powered wirelessly. In such an embodiment, a wireless receiver is positioned in an external junction box on the fan deck or in a MCE (motor center enclosure) or MCC (motor control center). The wireless receiver device is hardwired to the wiring in the aforementioned junction box, MCE or MCC and converts the received wireless signals from the wireless LRU gas sensor into digital signals which are then fed into the wiring network of the cooling tower and motor. These digital signals are also inputted into signal processing equipment such as signal conditioners, analyzers, data acquisition devices, computers and display screens.

In another embodiment, LRU gas sensors are mounted at other locations in the cooling tower but are hardwired into the cooling tower wiring network so that the LRU gas sensors are in electrical signal communication with the motor and external signal conditioning and analysis equipment.

In an alternate embodiment, an integrated printed circuit and wireway can be formed on either side of the motor housing for the LRU sensor.

In another embodiment, the external surface of a motor or other machine is configured to have integrated printed circuits (see FIG. 5) and wireways wherein the integrated printed circuits are in electrical signal communication with the LRU sensors, the internal wiring network of the motor or machine, or other components of the motor or machine.

In another embodiment, the motor or machine includes a cover that covers the LRU sensor when the LRU sensor is in the socket in the casing of the motor or machine, wherein the cover includes a printed circuit. The printed circuit can be integral with the cover or a separate assembly that is joined or attached to the cover. The printed circuit is electrically connected to the terminal block. This configuration is applicable to LRU sensor 2000 shown in FIG. 5.

In other embodiments, the motor casing and cover are configured to have internal wiring and wireways. In one embodiment, the cover is a multi-piece cover and comprises a separate printed circuit that is joined or attached to the cover but remains electrically isolated from the cover. In this embodiment, the printed circuit becomes the terminal block wherein all terminal points are electrically connected to an electrical interface connector on the motor or machine.

In another embodiment, the LRU sensor system of the present invention comprises a LRU sensor that is configured as a rotating-component temperature sensor. In such an embodiment, the LRU sensor is an infrared temperature sensor (e.g. infrared laser or other optical sensor) or other heat-sensor device that is directed toward permanent magnets that are attached to and rotate with the motor rotor. In this embodiment, the LRU sensor measures or senses the temperature of the permanent magnets during rotation of the rotor. Thus, in this embodiment, the LRU sensor measures the temperature of moving components. In another embodiment, the LRU sensor is used in an inside-out motor wherein the stator rotates. In such an embodiment, the LRU sensor measures the temperature of the rotating stator.

In another embodiment, the LRU sensor of the LRU sensor system of the present invention is a wireless airflow sensor that is mounted at different locations in the cooling tower. A receiving device is positioned in the external junction box, MCC or MCE and receives the wireless signals and converts these wireless signals into digital signals which are then fed into the cooling tower wiring network so that so that such signals can be processed and monitored by external signal conditioning devices, computers, digital acquisition devices, and display screens. In one embodiment, the wireless airflow sensor is configured as a wireless pressure sensor.

In another embodiment, the LRU sensor of the LRU sensor system of the present invention is a wireless temperature sensor that is external to the motor and mounted at a particular location in the cooling tower to measure the temperature of the cooling tower air or water such as in the collection basin. A receiving device is positioned in the external junction box, MCC or MCE and receives the wireless signals and converts these wireless signals into digital signals which are then fed into the cooling tower wiring network so that so that such signals can be processed and monitored by external signal conditioning devices, computers, digital acquisition devices, and display screens.

In other embodiments, the foregoing LRU sensors may be configured as optical sensors, RF sensors, optical encoders or photonic sensors. In such embodiments, the appropriate circuits and wiring networks are used with such sensors. Photonic sensors can be realized by photonic integrated circuits.

In other embodiments, the foregoing LRU sensors are integrated wireless sensors and configured for "plug and play" operation and comprise built-in amplifiers, transformers and cell phone wireless or optical wireless communication transmitters and receivers that can be used for system feedback and sensor calibration while installed and operating.

In other embodiments, the foregoing LRU sensors are configured for "plug and play" operation and connected internally to electrical and communication systems within the motor cavity. In this embodiment, the LRU sensor signals are transmitted via a wireless network in, on or about the motor.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A motor comprising:
    a casing having an interior and a socket that is accessible from outside of the casing;
    a stator assembly located within the interior and comprising a stator core and coils wrapped about the stator core, wherein the coils have coil end turns;
    a thermal well that extends through the coil end turns and into the stator core, the thermal well having an opening that is substantially aligned with the socket; and
    a Line-Replaceable Unit (LRU) temperature sensor comprising a sensor probe section disposed within the thermal well to sense the temperature in the stator core, wherein the thermal well electrically isolates the sensor probe section from the stator coils and the stator core.

2. The motor according to claim 1 wherein the sensor probe section includes a distal end within the thermal well and a stop-end member that is joined to the distal end so as to provide support and prevent movement of the sensor probe section while disposed within the thermal well.

3. The motor according to claim 1 wherein the Line-Replaceable Unit (LRU) temperature sensor further comprises a sensor head section that is attached to the sensor probe section and is positioned within the socket.

4. The motor according to claim 3 wherein the socket has an inner wall and the sensor head section includes a seal thereon to create a seal between the sensor head section and the inner wall of the socket so as to prevent moisture, fluid and other contaminants from entering the socket.

5. The motor according to claim 3 wherein the socket has an inner wall and the motor further comprises a seal joined to the inner wall of the socket to create a seal between the sensor head section and the inner wall of the socket so as to prevent moisture, fluid and other contaminants from entering the socket.

6. The motor according to claim 3 wherein the Line-Replaceable Unit (LRU) temperature sensor further comprises:
    electrically conductive members attached to the sensor head section; and
    electrical conductors that electrically connect the sensor probe section to the electrically conductive members of the sensor head section.

7. The motor according to claim 6 wherein the electrically conductive members on the sensor head section comprise printed circuit terminals.

8. The motor according to claim 6 further comprising:
    an interior motor structure within the interior of the motor; and
    a circuit board attached to and electrically insulated from the interior motor structure, the circuit board comprising electrically conductive members that contact the electrically conductive members on the sensor probe section.

9. The motor according to claim 8 wherein the electrically conductive members on the circuit board comprise printed circuit terminals.

10. The motor according to claim 8 further comprising an electrical connector attached to the casing of the motor and electrically connected to the electrically conductive members of the circuit board.

11. The motor according to claim 8 further comprising:
    a junction box having an interior and located within the interior of the motor and attached to the casing; and at least one electronic device located within the interior of the junction box and electrically connected to the electrically conductive members of the circuit board.

12. The motor according to claim 11 wherein the at least one electronic device is chosen from the group comprising an electrical power conditioning device to provide electrical power to the Line-Replaceable Unit (LRU) sensor, a battery to provide electrical power to the Line-Replaceable Unit (LRU) sensor, a battery charging device, a generator, a power transmission device, a sensor amplifier, a wireless communication device and an instrumentation termination block.

* * * * *